US006823744B2

(12) United States Patent
Ohsato et al.

(10) Patent No.: US 6,823,744 B2
(45) Date of Patent: Nov. 30, 2004

(54) SIX-AXIS FORCE SENSOR

(75) Inventors: Takeshi Ohsato, Wako (JP); Yusuke Hirabayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 27 days.

(21) Appl. No.: 10/339,496

(22) Filed: Jan. 10, 2003

(65) Prior Publication Data
US 2003/0140713 A1 Jul. 31, 2003

(30) Foreign Application Priority Data

Jan. 11, 2002 (JP) ........................................ 2002-005334
Mar. 5, 2002 (JP) ........................................ 2002-059447

(51) Int. Cl.[7] ................................................ G01D 7/00
(52) U.S. Cl. ................................................ 73/862.041
(58) Field of Search ..................... 73/862.041, 862.044, 73/862.045

(56) References Cited

U.S. PATENT DOCUMENTS

| | | | |
|---|---|---|---|
| 4,448,083 A | | 5/1984 | Hayashi |
| 5,095,762 A | * | 3/1992 | Holm-Kennedy et al. ................ 73/862.041 |
| 5,263,375 A | * | 11/1993 | Okada .................. 73/862.042 |
| 5,490,427 A | * | 2/1996 | Yee et al. ..................... 73/767 |
| 5,811,694 A | * | 9/1998 | Kamentser et al. .... 73/862.045 |
| 5,889,214 A | * | 3/1999 | Kang et al. ............ 73/862.044 |

FOREIGN PATENT DOCUMENTS

| | | |
|---|---|---|
| JP | 57-169643 A | 10/1982 |
| JP | 01-063831 A | 3/1989 |

* cited by examiner

Primary Examiner—Edward Lefkowitz
Assistant Examiner—T Miller
(74) Attorney, Agent, or Firm—Birch, Stewart, Kolasch & Birch, LLP

(57) ABSTRACT

A six-axis force sensor 1 consists of a sensor chip having a six-axis force sensor function formed using a semiconductor substrate 2 and film-forming technology. Connecting parts 5A to 5D are each made up of a high-rigidity bridge part and a low-rigidity elastic part. Semiconductor strain resistance devices Sya1–Sya3, Syb1–Syb3, Sxa1–Sxa3, and Sxb1–Sxb3 consisting of active layers are disposed on the front sides of the connecting parts. The elastic parts of the connecting parts absorb excess strains acting on the connecting parts and suppress the occurrence of strain spread over the whole semiconductor substrate. Because forces and moments of six specified axis components cause strains to occur selectively in corresponding strain resistance devices, by suitably combining measured results from selected resistance devices it is possible to effectively separate an applied external force into six components of force and moment and greatly suppress other axis interference in the measured results. As a results, six components of force and moment of an external force can be measured with good reproducibility on the basis of the strains arising in the resistance devices disposed on the connecting parts.

14 Claims, 19 Drawing Sheets

FIG. 12
(a) 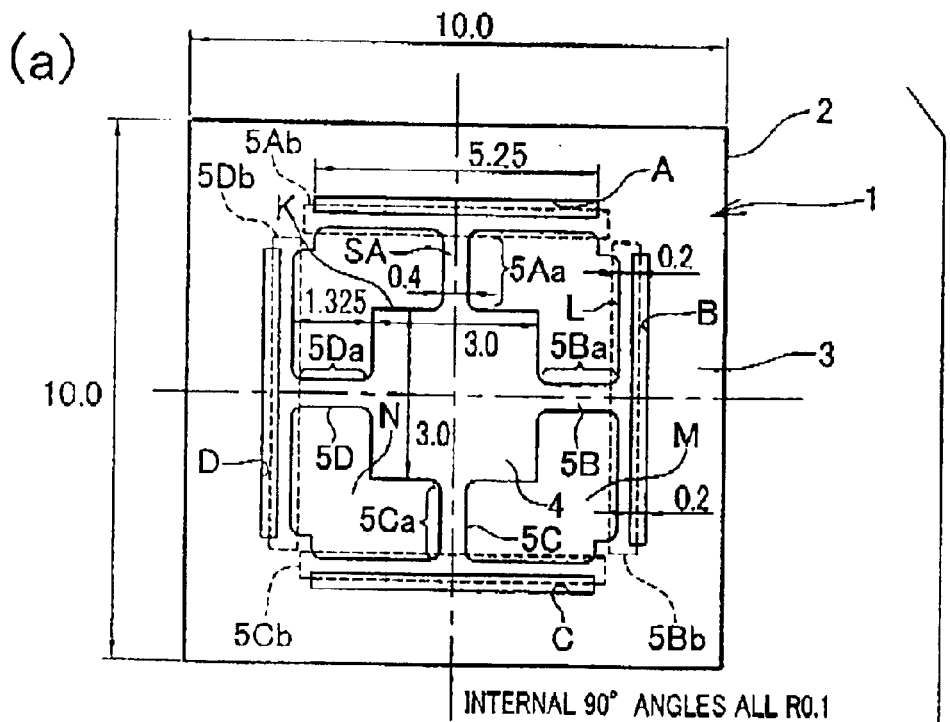
(b) 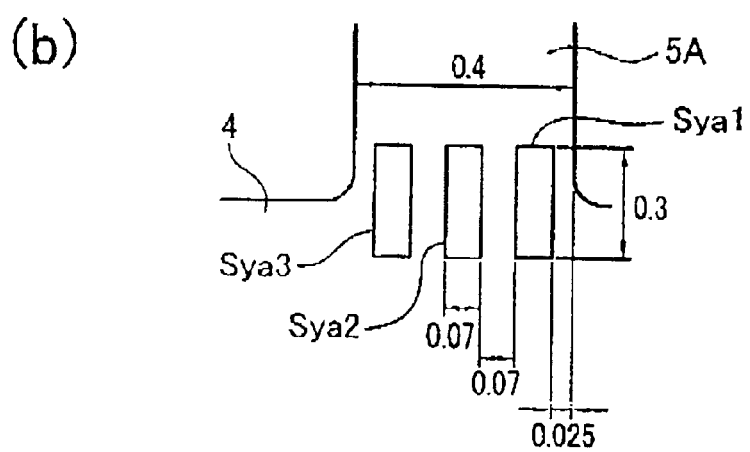
(c) 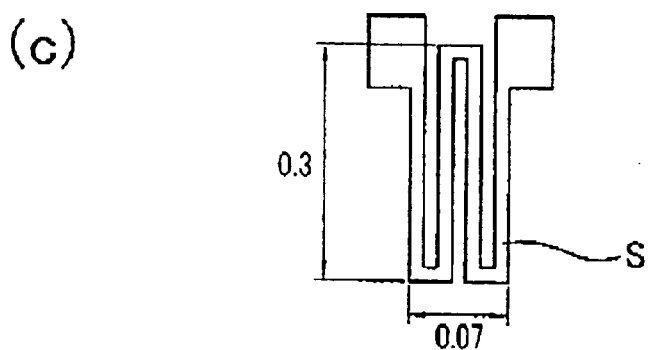

RELATIONSHIP BETWEEN FORCES / MOMENTS AND COMPUTED RESISTANCE CHANGE PROPORTIONS

| | +Fx[N] | +Fy[N] | +Fz[N] | +Mx[N·cm] | +My[N·cm] | +Mz[N·cm] |
|---|---|---|---|---|---|---|
| Sig1 ((R'Sya1−R'Sya3)+(R'Syb3−R'Syb1))/4 | 0.00431 | 0 | 0 | 0 | −0.00115 | 0 |
| Sig2 ((R'Sxa3−R'Sxa1)+(R'Sxb1−R'Sxb3))/4 | 0 | 0.00431 | 0 | 0.00115 | 0 | 0 |
| Sig3 (R'Sxa2+R'Sya2+R'Sxb2+R'Syb2)/4 | −0.00001 | −0.00001 | 0.00683 | −0.00032 | −0.00032 | 0.00014 |
| Sig4 (R'Sya2−R'Syb2)/2 | 0 | −0.00019 | 0 | 0.04230 | 0 | 0 |
| Sig5 (R'Sxa2−R'Sxa2)/2 | 0.00019 | 0 | 0 | 0 | 0.04230 | 0 |
| Sig6 ((R'Sxa3−R'Sxa1)+(R'Sya3−R'Sya1)+(R'Sxb3−R'Sxb1)+(R'Syb3−R'Syb1))/8 | 0 | 0 | 0 | 0 | 0 | 0.01188 |

FIG. 13

RELATIONSHIP BETWEEN FORCES / MOMENTS AND COMPUTED RESISTANCE CHANGE PROPORTIONS

| | +Fx[N] | +Fy[N] | +Fz[N] | +Mx[N·cm] | +My[N·cm] | +Mz[N·cm] |
|---|---|---|---|---|---|---|
| Sig1 ((R'Sxb2+R'Sxb2u)−(R'Sxa2+R'Sxa2u))/4 | 0.00019 | 0 | 0 | 0 | 0 | 0 |
| Sig2 ((R'Syb2+R'Syb2u)−(R'Sya2+R'Sya2u))/4 | 0 | 0.00019 | 0 | 0 | 0 | 0 |
| Sig3 ((R'Sxa2−R'Sxa2u)+(R'Sya2−R'Sya2u)+(R'Sxb2−R'Sxb2u)+(R'Syb2−R'Syb2u))/8 | 0 | 0 | 0.00681 | 0 | 0 | 0 |
| Sig4 ((R'Sya2−R'Sya2u)−(R'Syb2−R'Syb2u))/4 | 0 | 0 | 0 | 0.04230 | 0 | 0 |
| Sig5 ((R'Sxb2−R'Sxb2u)−(R'Sxa−R'Sxa2u))/4 | 0 | 0 | 0 | 0 | 0.04230 | 0 |
| Sig6 ((R'Sxa3−R'Sxa1)+(R'Sya3−R'Sya1)+(R'Sxb3−R'Syb1)+(R'Syb3−R'Syb1))/8 | 0 | 0 | 0 | 0 | 0 | 0.01188 |

RELATIONSHIP BETWEEN FORCES / MOMENTS AND COMPUTED RESISTANCE CHANGE PROPORTIONS

| | +Fx[N] | +Fy[N] | +Fz[N] | Mx+[N·cm] | +My[N·cm] | +Mz[N·cm] |
|---|---|---|---|---|---|---|
| g1 ((R'Sya1−R'Sya3)+(R'Syb3−R'Syb1)+ (R'Sya1u−R'Sya3u)+(R'Syb3u−R'Syb1u))/8 | 0.00431 | 0 | 0 | 0 | 0 | 0 |
| g2 ((R'Sxa3−R'Sxa1)+(R'Sxb1−R'Sxb3)+ (R'Sxa3u−R'Sxa1u)+(R'Sxb1u−R'Sxb3u))/8 | 0 | 0.00431 | 0 | 0 | 0 | 0 |
| g3 ((R'Sxa2−R'Sxa2u)+(R'Sya2−R'Sya2u)+ (R'Sxb2−R'Sxb2u)+(R'Syb2−R'Syb2u))/8 | 0 | 0 | 0.00681 | 0 | 0 | 0 |
| g4 ((R'Sya2−R'Sya2u)−(R'Syb2−R'Syb2u))/4 | 0 | 0 | 0 | 0.04230 | 0 | 0 |
| g5 ((R'Sxb2−R'Sxb2u)−(R'Sxa2−R'Sxa2u))/4 | 0 | 0 | 0 | 0 | 0.04230 | 0 |
| g6 ((R'Sxa3−R'Sxa1)+(R'Sya3−R'Sya1)+ (R'Sxb3−R'Sxb1)+(R'Syb3−R'Syb1)+ (R'Sxa3u−R'Sxa1u)+(R'Sya3u−R'Sya1u)+ (R'Sxb3u−R'Sxb1u)+(R'Syb3u−R'Syb1u))/16 | 0 | 0 | 0 | 0 | 0 | 0.01188 |

RELATIONSHIP BETWEEN APPLIED AXIS FORCE (STRESS / TORQUE) AND RESISTANCE CHANGE PROPORTION

| | 2. APPLIED AXIS FORCE (STRESS / TORQUE) | | | | | |
|---|---|---|---|---|---|---|
| | +Fx[N] | +Fy[N] | +Fz[N] | +Mx[N·cm] | +My[N·cm] | +Mz[N·cm] |
| Sig1 ((R'Syz1−R'Sya3)+(R'Syb3−R'Syb1))/4 | 0.000710 | 0 | 0 | 0 | 0.000220 | 0 |
| Sig2 ((R'Sxa3−R'Sxa1)+(R'Sxb1−R'Sxb3))/4 | 0 | 0.000710 | 0 | −0.000220 | 0 | 0 |
| Sig3 (R'Sxa2+R'Sya2+R'Sxb2+R'Syb2)/4 | 0.000002 | 0.000002 | 0.001200 | −0.000002 | −0.000003 | −0.000018 |
| Sig4 (R'Sya2 − R'Syb2) /2 | 0 | −0.000081 | 0 | 0.000685 | 0 | 0 |
| Sig5 (R'Sxb2 − R'Sxa2) /2 | 0.000081 | 0 | 0 | 0 | 0.00069 | 0 |
| Sig6 ((R'Sxa3−R'Sxa1)+(R'Sya3−R'Sya1)+(R'Sxb3−R'Syb1)+(R'Syb3−R'Syb1))/8 | 0 | 0 | 0 | 0 | 0 | 0.00013 |

FIG. 19

SIX-AXIS FORCE SENSOR

FIELD OF THE INVENTION

This invention relates to a six-axis force sensor, and particularly to a small and highly precise six-axis force sensor in which strain resistance devices fabricated using semiconductor manufacturing process technology are used and which can detect six force and moment components and be utilized as a force-sensing sensor of a robot or the like.

BACKGROUND OF THE INVENTION

Modern automatic machines such as machine tools and robots, in the course of their work or operation, perform work in which they apply forces to workpieces, or are themselves subject to actions of forces from outside. Consequently, it is necessary for machine tools and robots to detect forces and moments acting on them from outside and to perform control corresponding to these forces and moments. For control corresponding to external forces and moments to be carried out properly, it is necessary for the forces and moments acting from outside to be detected exactly.

In this connection, various types of multi-axis force sensors to be used as force-sensing sensors and man-machine interfaces have been proposed. Generally, force sensors can be classified, according to the detection method that they use, as either elastic-type force sensors, which detect a deformation proportional to a force, or force-balance-type force sensors, which measure a force by balancing it with a known force. As a principle structure, force sensors generally have multiple strain resistance devices provided on a distorting body part which deforms elastically in correspondence with external forces.

With this structure, when an external force acts on a distorting body part of the multi-axis force sensor, electrical signals corresponding to degrees of deformation of the distorting body part are outputted from the strain resistance devices. On the basis of these electrical signals it is possible to detect two or more force or moment components acting on the distorting body part.

To keep up with size reductions of devices equipped with multi-axis force sensors, size reductions of multi-axis force sensors themselves are sought. Accordingly, there is an increasing need for multi-axis force sensors which have good sensitivity and high precision while being small.

A typical multi-axis force sensor is the six-axis force sensor. The six-axis force sensor is a force sensor of the elastic type mentioned above, and has multiple strain resistance devices on a distorting body part. The six-axis force sensor divides an external force into axial stress components (forces Fx, Fy, Fz) in the axis directions and torque components (torques Mx, My, Mz) about the axis directions of three orthogonal coordinate axes (an X-axis, a Y-axis, a Z-axis), and detects it as six axis components.

A first example of a multi-axis force sensor in related art is the 'Multiple Force Component Load Cell' disclosed in JP-B-S.63-61609 (Publication date Nov. 29, 1988; corresponding U.S. Pat. No. 4,448,083). This document discloses a six-axis force sensor. This six-axis force sensor has a construction wherein multiple strain gauges are affixed to a distorting body having a solid (three-dimensional) structure. This sensor is a six-component force sensor and has a structure such that mutual interference arising among the six force components detected is reduced. The six-axis force sensor is made up of a central force-receiving part, a fixed annular part around this, and between these, four T-shaped connecting parts equally spaced around the axis of the force-receiving part. The strain gauges are affixed to low-rigidity portions of the beams of the T-shaped connecting parts.

With this structure wherein strain gauges are affixed to a distorting body, size reduction is limited; manufacturing reproducibility is poor and dispersion arises among units; and also problems such as peeling of the affixing layer arise due to repeated shock stresses and thermal stresses. When peeling of the affixing layer occurs, the measuring precision deteriorates. Alignment deviation also causes the measuring precision to deteriorate. The problem arises that it is difficult to make the mounting positions accurate enough to ensure good detection accuracy.

A second example of a multi-axis force sensor in related art is the 'Two-or-more-Component Force-Detecting Device' disclosed in Japanese Patent Publication No. 2746298 (Published May 6, 1998, corresponding U.S. Pat. No. 4,884,083). In the multi-axis force sensor disclosed in this document, multiple strain resistance devices are fabricated on a substrate using semiconductor manufacturing process technology, and a strain gauge element is assembled integrally to a distorting body part. The substrate is made up of a peripheral part and a central part. According to this document, the problems of the multi-axis force sensor of the first related art mentioned above can be resolved, the precision of the fabrication process can be raised, the reproducibility of fabrication can be made good, and the multi-axis force sensor can be reduced in size. However, with this sensor, there is a high probability of mutual interference arising among the six axis components detected.

A third example of a multi-axis force sensor of related art is the 'Contact Force Sensor' disclosed in JP-B-H.7-93445. In this contact force sensor also, piezoelectric sensors made by forming resistance devices on one side of an annular structural body made of a semiconductor are used, and semiconductor manufacturing process technology is utilized.

Of the multi-axis force sensors of these first through third examples of related art, whereas in the first multi-axis force sensor strain resistance devices (strain gauges) are affixed as external elements, in the second and third multi-axis force sensors, strain resistance devices are formed integrally on a semiconductor substrate by utilizing semiconductor device manufacturing process technology. The second and third multi-axis force sensors have the merit that they make it possible to resolve the problems associated with the first multi-axis force sensor.

However, related art multi-axis force sensors fabricated using semiconductor device manufacturing process technology have had the characteristic structurally that, when an attempt is made to detect a force or moment on each of three orthogonal axes, the whole substrate distorts isotropically in correspondence with the applied force or moment, and have also had the problem that the disposition of the multiple strain resistance devices on the substrate is not optimal and an external force acting on the distorting body part cannot be separated into components with good precision.

That is, in six-axis force sensors, there has been the problem that for example when an external force is applied so that only an axial stress component Fx arises, stresses arise and outputs are produced in connection with components other than Fx, which should properly be 0. There has been the problem that it is difficult to separate an external force applied from an unknown direction into individual components with good precision. The electrical signal components outputted from the resistance devices corresponding to the respective axis components superpose onto the other axes, and the measuring sensitivity of the axis components of force or moment decreases.

The problem of not being able to separate the axis components (forces and moments) of an external force acting on the distorting body part in a six-axis force sensor is known as the problem of 'other axis interference'. This problem of other axis interference is one which cannot be ignored from the point of view of realizing a practical six-axis force sensor.

The problem of other axis interference in a six-axis force sensor will now be explained more specifically, from a mathematical point of view, using equations.

In a six-axis force sensor, as mentioned above, as six axis components pertaining respectively to an X-axis, a Y-axis and a Z-axis, forces Fx, Fy and Fz and moments Mx, My and Mz are detected. The six-axis force sensor outputs six signals Sig1 to Sig6 ('computed resistance change proportions') using resistance changes of strain resistance devices provided on a distorting body part and on the basis of an external computing part. These six output signals Sig1 to Sig6 are associated with the six axis components Fx, Fy, Fz, Mx, My, Mz using 6×6 matrix elements obtained by finding in advance the size (electrical change proportion) of each signal with respect to an input made by applying as an external force a single axis component only.

For a six-axis force sensor, the six axis components Fx, Fy, Fz, Mx, My, Mz will be written respectively as F1, F2, F3, F4, F5, F6 (generally, 'Fi:i=1–6'). The above-mentioned six output signals Sig1 to Sig6 will be written S1, S2, S3, S4, S5, S6 (generally, 'Si:i=1–6').

Between Si and Fi above, expressed with a matrix equation (the symbols '( )' in the equation indicating matrices), the following relationship holds.

$$(Si)=(mij)\times(Fj) \ (j=1\text{–}6) \quad (101)$$

That is, the equation (101) has the following meaning:

$$S1=m11.F1+m12.F2+m13.F3+m14.F4+m15.F5+m16.F6$$

$$S2=m21.F1+m22.F2+m23.F3+m24.F4+m25.F5+m26.F6 \ldots$$
(abbreviated)

$$S6=m61.F1+m62.F2+m63.F3+m64.F4+m65.F5+m66.F6$$

In equation (101), by finding in advance the computed respective resistance change proportions S1–S6 corresponding to the input of a single component only, it is possible to obtain the matrix elements mij of the matrix (mij). By calculating the inverse matrix $(mij)^{-1}$ of the obtained matrix (mij), the following equation is obtained:

$$(Fi)=(mij)^{-1}\times(Sj)=(m'ij)\times(Sj) \quad (102)$$

The equation (102) has the following meaning:

$$F1=m'11.S1+m'12.S2+m'13.S3+m'14.S4+m'15.S5+m'16.S6$$

$$F2=m'21.S1+m'22.S2+m'23.S3+m'24.S4+m'25.S5+m'26.S6 \ldots$$
(abbreviated)

$$F6=m'61.S1+m'62.S2+m'63.S3+m'64.S4+m'65.S5+m'66.S6$$

In the above equation (102), "m'ij" is a matrix element of the 6×6 inverse matrix $(mij)^{-1}$.

From the above equation (102), on the basis of the computed resistance change proportions (S1–S6) obtained from the resistance change proportions of the semiconductor strain resistance devices, it is possible to calculate the six axis components F1–F6 (the forces and moments of each axis direction).

In equations (101) and (102) above, if the values of the matrix elements mij, m'ij are all large, then for example when the computed resistance change proportions Si fluctuate due to the superposition of noise, that influence appears in the measurement values of F1–F6. That is, when there is an input consisting of a single component only as an external force, although the inputs of the other components are "0", there is a high probability of the phenomenon arising of the measurement results not being "0" due to disturbances such as noise.

AS mentioned above, the obtained measured value of one of the six axis components, that is, forces or moments, fluctuating as a result of a force or moment of another axis is defined as 'other axis interference occurring'.

Ideally, in the matrix (m'ij), the non-diagonal elements i.e. the elements other than the diagonal elements m'11, m'22, m'33, m'44, m'55 and m'66, should be "0". In this case, the above-mentioned equation (102) becomes as follows:

$$F1=m'11.S1$$

$$F2=m'22.S2 \ldots \text{(abbreviated)}$$

$$F6=m'66.S6$$

It this relationship holds, the calculation becomes extremely simple, and other axis interference can be prevented.

In practice, even if the non-diagonal elements cannot be made "0", if the values of the non-diagonal elements can be made extremely small compared to the diagonal elements, the problem of other axis interference can be reduced.

However, with the second and third multi-axis force sensors of related art mentioned above, because the whole substrate distorts and insufficient consideration has been given to the suitability of the disposition pattern of the semiconductor strain resistance devices, the non-diagonal elements of the matrix (m'ij) cannot be made "0" or made sufficiently small compared with the diagonal elements, and the probability of other axis interference occurring is high. Also, with the multi-axis force sensors mentioned above, due to other axis interference readily occurring, noise caused by unexpected disturbances and the like superposes on the electrical signals from the strain resistance devices, and consequently there is a high risk of measurement results fluctuating greatly with other axis interference as the cause. Consequently, when the second and third multi-axis force sensors mentioned above are used on a robot or the like, depending on their installation conditions, other axis interference causes their measured values to fluctuate, and when they are made general-purpose parts there are problems with reproducibility and robustness.

A fourth example of a multi-axis force sensor of related art is the 'Micro-Manipulator Having Force Sensor' disclosed in Japanese Unexamined Patent Publication No. H.11-333765. The force sensor disclosed in this document is fabricated using semiconductor manufacturing process technology, like the second and third related art examples mentioned above, and a three-component force sensor made up of a base and a central thick part and thin supporting parts connecting thereto and having strain sensors provided on the supporting part is shown.

To resolve the above-mentioned shortcomings of the multi-axis force sensors of the aforementioned second and third related art examples using semiconductor manufacturing process technology, in this fourth related art example, a structure is proposed wherein components of strain are separated axis by axis. However, although this structure achieves a slight improvement compared to other related art, it is a construction for performing detection of forces in the directions of three axes (X-axis, Y-axis, Z-axis), and when it is used as a six-axis force sensor its component-separating capability is inadequate and it cannot resolve the problem of other axis interference.

A further, fifth example of a multi-axis force sensor of related art is the 'Sensor' disclosed in JP-B-H.5-75055. This sensor is formed using a semiconductor substrate and has a central supporting body, a peripheral supporting body, and a plurality of connecting parts (beams) connecting these. According to FIG. 1 of this document, a resistance film pattern made up of multiple resistance devices is formed integrally with the surfaces of two predetermined connecting parts (beams) by film-forming technology. Because the connecting parts are parts of the semiconductor substrate, they have a thin plate shape. When the sensor receives a force on the central supporting body, the semiconductor substrate itself bends as a whole, and six force components are taken out by the multiple resistance devices provided on the connecting parts. In the sensor of this related art example also, there is a possibility of mutual interference among the detected six force components.

Another issue addressed by the invention will now be discussed. A six-axis force sensor fabricated using semiconductor manufacturing process technology contributes to sensor device size reduction. To make a six-axis force sensor small, the semiconductor substrate becomes small and becomes thin. In a six-axis force sensor formed using a semiconductor substrate, the semiconductor substrate itself functions as a distorting body. Consequently, there is a limit on the range of forces which can be measured, which depends on the basic strength of the semiconductor substrate. From the point of view of practical application, there is a need for a sensor to be designed so that this limit is not problematic, and for the measurement range to be raised to widen the range of applications.

SUMMARY OF THE INVENTION

It is therefore an object of the invention to solve the problems mentioned above and provide a six-axis force sensor with which in detecting an applied external force it is possible to suppress other axis interference, detect axis components of force and moment with high precision, and increase robustness and reproducibility.

It is another object of the invention to provide a six-axis force sensor which while suppressing other axis interference dramatically raises the detectable level of force, has a widened range of applications, and contributes to practical usability of six-axis force sensors.

To achieve these objects, a six-axis force sensor according to the invention has the following construction.

The six-axis force sensor according to the invention consists of a thin plate-shaped sensor chip formed using a substrate by semiconductor film-forming processes and having a six-axis force sensor function. The sensor chip has an action part for an external force to be applied to, a support part to be fixed to an external structure, and a number of connecting parts each having a high-rigidity bridge part joined to the action part and a low-rigidity elastic part joined to the support part and connecting together the action part and the support part. A number of strain resistance devices consisting of active layers are formed on at least one of the front and rear faces of each of the connecting parts in an area where deformation strain effectively occurs, and these strain resistance devices are electrically connected to corresponding electrodes provided on the support part.

The six-axis force sensor is a sensor chip having a six-axis force sensor function formed using a semiconductor substrate and film-forming technology. The connecting parts are each made up of a high-rigidity bridge part and a low-rigidity elastic part. Semiconductor strain resistance devices (Sya1–Sya3, Syb1–Syb3, Sxa1–Sxa3, Sxb1–Sxb3) consisting of active layers are disposed on the front sides of the connecting parts. The elastic i.e. low-rigidity parts of the connecting parts have the function of absorbing excess strains acting on the connecting parts and suppressing the occurrence of strains extending over the semiconductor substrate as a whole. Because forces and moments of specified axis components cause strains to occur selectively in corresponding strain resistance devices, by suitably combining measured results from selected resistance devices it is possible to effectively separate an applied external force into six components of force and moment and greatly suppress other axis interference in the measured results. As a result, a six-axis force sensor according to the invention can measure six components of force and moment of an external force applied to the action part with good reproducibility on the basis of the strains arising in the resistance devices disposed on the connecting parts In the six-axis force sensor, the connecting parts are disposed with uniform spacing around the action part. The low-rigidity parts are elastic parts each connected to the support part at two locations. The high-rigidity parts are bridge parts connected to the action part. Accordingly, the elastic parts have the function of absorbing excess strains acting on the bridge parts and suppressing the occurrence of strains extending over the semiconductor substrate as a whole caused by the application of a force or moment in one direction, and because a force or moment in a given direction causes a strain selectively in a corresponding resistance device, other axis interference is greatly suppressed.

Preferably, the connecting parts are disposed with uniform spacing around the action part and so that adjacent connecting parts are mutually perpendicular.

Preferably, the action part is square and each of the connecting parts is formed in a T-shape made by its elastic part and its bridge part and is disposed at a respective one of the four sides of the action part. The strain resistance devices are disposed on an area of the surface of the bridge part near the boundary between the bridge part and the action part.

Preferably, the strain resistance devices are disposed on a narrowed portion formed in the bridge part and, more preferably, are disposed on the bridge part of the respective connecting part in parallel with the length direction of the bridge part and arranged side by side in a line in a direction perpendicular to the length direction of the bridge part. Resistance devices for temperature compensation can also be disposed on the support part.

In a six-axis force sensor according to the invention as described above, the strain resistance devices are disposed on the surf ace of the bridge part in an area where, when an external force is applied to the action part, greater strains arise than in the action part and other areas of the connecting part. As a result, the resistance devices can detect required components of force and moment selectively, the resistance changes arising in the resistance devices with respect to the external force can be made large, the precision with which the forces and moments of an external force applied to the action part are measured increases, and robustness and stability can be obtained in the measurement results.

Because the strain resistance devices are disposed on the surface of each of the connecting parts near the joining portion between its bridge part and the action part, they are disposed in the area where strains caused by the external force most concentrate. As a result, the changes in the resistance values of the semiconductor resistance devices arising from an external force can be made large.

If the resistance devices are disposed on a narrowed portion formed in the bridge part, because in the connecting parts corresponding to components of force and moment of an external force applied to the action part the greatest stresses arise in the narrowed part, strains concentrate most in this narrowed part, and the resistance changes of the resistance devices caused by the external force can be made large.

Disposing multiple resistance devices on each bridge part in parallel with the long axis direction of the bridge part makes it possible to combine resistance change proportions obtained from multiple resistance devices as electrical signals are taken out. This makes it possible to select resistance devices so that other axis interference is prevented, i.e. so that resistance change proportions pertaining to forces and moments in other than a certain direction cancel each other out, and makes it possible to compose optimal formulas for obtaining six components of force and moment from resistance change proportions of these resistance devices. On the basis of these formulas, the non-diagonal elements in a matrix expressing the relationship between forces and moments and resistance change proportions can be made "0" or amply small.

By disposing semiconductor resistance devices for temperature compensation on the support part and interconnecting them to corresponding electrodes it is possible to detect resistance changes due to the temperature of the surroundings. By correcting measured results of resistance change in correspondence with the temperature characteristics of the semiconductor resistance devices on this basis it is possible to obtain force and moment measurements unaffected by the ambient temperature.

In the six-axis force sensor as arranged above, preferably, a guard interconnection at a ground potential is provided so as to surround the non-ground interconnections for the strain resistance devices. In this case, in the detection of currents from the resistance devices, disturbances caused by high-frequency noise are suppressed, and because the guard interconnection shields against cross-talk from the interconnections of other resistance devices, the S/N-ratio of current measurement of resistance changes of the resistance devices can be increased, the precision with which component forces and moments of an applied external forces are measured can be increased, and robustness and stability are obtained in the measurement results.

In the six-axis force sensor as arranged above, preferably, a bias electrode for impressing a bias voltage on the substrate is provided. With this construction, by means of an impressed bias, it is possible to grow a depletion layer at the active layer interfaces and thereby to effect insulation between the active layers and the semiconductor substrate and between adjacent active layers, and consequently leak currents decrease and current noise influences can be reduced. Also, by electrically fixing the substrate at a fixed potential, variation of potential can be prevented and resistance to noise can be increased, and resistance changes in the semiconductor resistance devices can be measured with high precision; consequently, the measurement precision of component forces and moments of an applied external force can be increased, and robustness and stability can be obtained in the measurement results.

Preferably, at least one of the strain resistance devices on each of the connecting parts is disposed on the rear side of the substrate in the area corresponding to the area on the front side of the substrate where the strain resistance devices are disposed on the bridge part. By means of this construction, on the basis of resistance changes of resistance devices formed on both the front side and the rear side of the substrate, an external force applied to the action part can be better resolved into specific force and moment components compared to when resistance devices are provided only on the front side of the substrate, and more robustness and stability can be obtained in the measurement results.

In this six-axis force sensor, the internal corners at the joining portions of the connecting parts and the action part, the joining portions of the connecting parts and the support part, and the joining portions of the elastic parts and the bridge parts, are all worked to a circular arc shape. With this construction, stresses at the joining portions are dispersed, concentration of stress at the internal corners arising from the external force applied to the action part is suppressed, structural strength is increased, and the measurable range of applied external forces can be widened.

Another six-axis force sensor provided by the invention has a thin plate-shaped sensor chip formed using a substrate by semiconductor film-forming processes and having a six-axis force sensor function and including at least an action part for receiving an external force and a support part supporting the action part, and a structural body provided around the sensor chip and including an external force application part to which an external force is applied, a plinth part for supporting the sensor chip, an external force buffering mechanism fixing the external force application part to the plinth part, and an external force transmitting part, and the external force application part and the action part are linked by the external force transmitting mechanism.

In this six-axis force sensor, a sensor chip made using a semiconductor substrate is provided with a structural body made up of an external force application part, a plinth part, an external force buffering mechanism and an external force transmitting mechanism, so that the external force is attenuated as it acts on the sensor chip. By this means it is possible, while suppressing the problem of other axis interference in a six-axis force sensor, to raise the load-withstanding capability of the sensor, raise its dynamic range, enlarge its measurable range of external forces, and raise its practical usability. Also, a buffering mechanism for the six-axis force sensor is realized with a simple structure, and by optimizing this structure it is possible to adjust the load-withstanding characteristics of the sensor. It is possible to manufacture a six-axis force sensor which is resistant to external noise, has high reproducibility of detection performance, can be fabricated without dispersion arising in its performance, and is optimized with respect to one of various force ranges.

In the construction described above, preferably, the sensor chip has an action part, a support part, four connecting parts, and multiple strain resistance devices fabricated by semiconductor film-forming processes on parts where deformation will occur. An insulating member can be provided between the sensor chip and the plinth part.

Because the sensor chip has four connecting parts and multiple strain resistance devices in a predetermined disposition pattern, this six-axis force sensor has a detection performance such that other axis interference is suppressed as far as possible. Because an insulating member is interposed between the sensor chip and the plinth part, electrical noise can be prevented from passing from the structural body having the buffering mechanism to the sensor chip.

BRIEF DESCRIPTION OF THE DRAWINGS

The above-mentioned objects and characteristics of the invention will become clearer from the following description of presently preferred embodiments thereof illustrated in the accompanying drawings, wherein:

FIGS. 12(a), (b) and (c) are dimension views showing the shapes and dimensions of constituent parts of a specific example of a prototype six-axis force sensor;

FIG. 13 is a table showing a relationship between force/moment applied to the action part in different axis directions and resulting computed resistance change proportion per unit of the applied force/moment in the six-axis force sensor of the first preferred embodiment;

FIG. 15 is a table showing a relationship between force/moment applied to the action part in different axis directions and resulting computed resistance change proportion per unit of the applied force/moment in the six-axis force sensor of the first preferred embodiment when four strain resistance devices are provided on its rear side;

FIG. 16 is a table showing a relationship between force/moment applied to the action part in different axis directions and resulting computed resistance change proportion per unit of the force/moment in the six-axis force sensor of the first preferred embodiment when twelve strain resistance devices are provided on its rear side;

FIG. 19 is a table showing a matrix relating applied axis force/moments Fx, Fy, Fz, Mx, My, Mz to resulting output signals Sig1–Sig6 in the six-axis force sensor of the third preferred embodiment;

DETAILED DESCRIPTION OF THE PREFERRED EMBODIMENTS

Preferred embodiments of the invention will now be described, with reference to the accompanying drawings.

Figure 1:
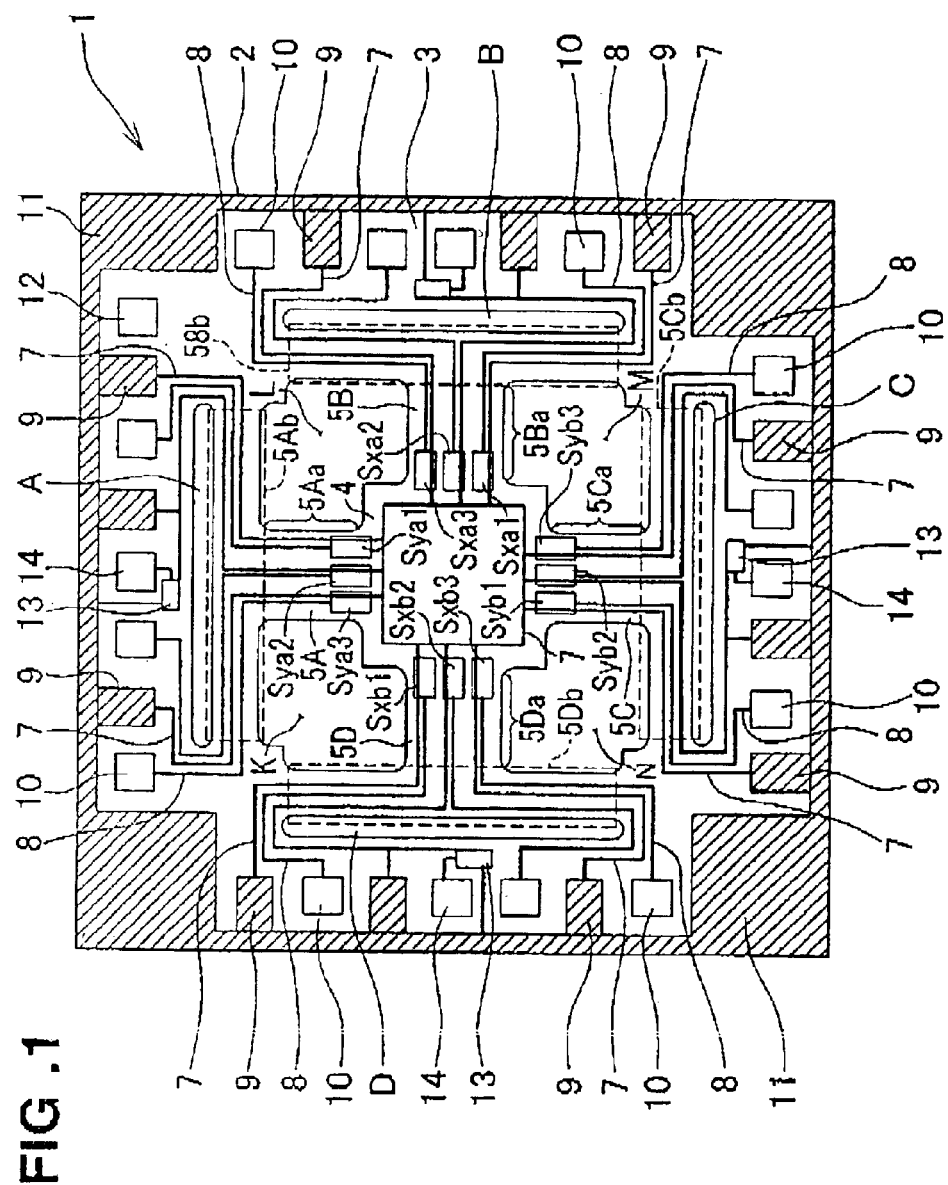
FIG. 1 is a plan view showing the structure of a first preferred embodiment (sensor chip) of a six-axis force sensor according to the invention.

First, with reference to FIG. 1, a first preferred embodiment of a six-axis force sensor according to the invention will be described. In FIG. 1, the six-axis force sensor 1 of this preferred embodiment is formed using a semiconductor substrate 2 which is preferably square in plan shape. The six-axis force sensor 1 has a plate-like shape derived from the semiconductor substrate. The six-axis force sensor 1 is preferably made by applying semiconductor manufacturing process technology (etching processes such as photolithography, resist patterning, ion implantation, film-forming processes such as P-CVD, sputtering, RIE) to one of its surfaces, to work the plan shape of the square semiconductor substrate itself and to carry out film-forming in predetermined regions of one surface of the semiconductor substrate. In this way, the six-axis force sensor 1 of this first preferred embodiment is formed as a semiconductor sensor device, and from this point of view it will hereinafter also be called 'the sensor chip 1'.

In the sensor chip 1, a functional part for detecting six axis components as a six-axis force sensor is made up of twelve strain resistance devices (piezo-resistance devices; hereinafter called 'resistance devices') Sxa1–Sxa3, Sxb1–Sxb3, Sya1–Sya3, Syb1–Syb3, consisting of an active layer (diffusion layer) formed on one surface of the semiconductor substrate 2.

The total of twelve resistance devices are disposed in sets of three (Sxa1, Sxa2, Sxa3), (Sxb1, Sxb2, Sxb3), (Sya1, Sya2, Sya3), (Syb1, Syb2, Syb3), each set being disposed on one of four T-shaped connecting parts 5A–5D, which will be further discussed later, along a boundary between the respective connecting part and an action part 4.

Figure 4:
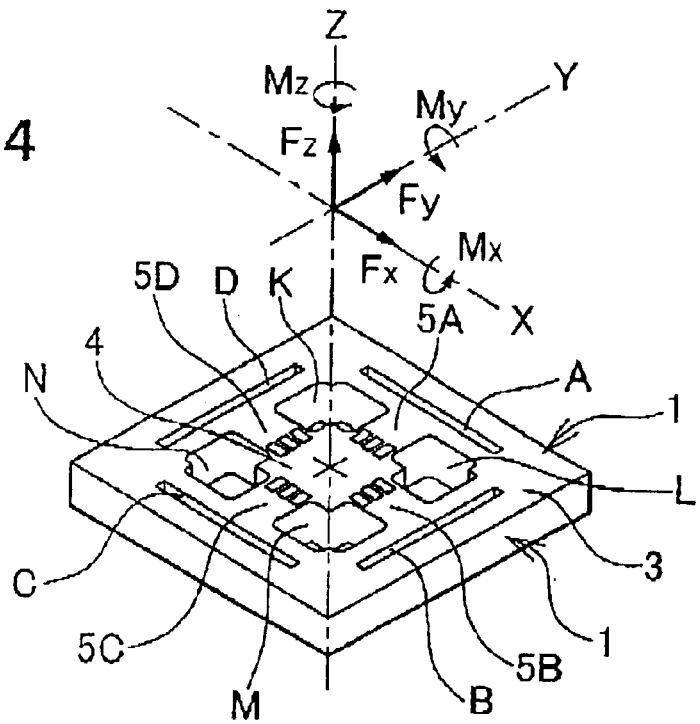
FIG. 4 is a perspective view illustrating forces and moments of different axes acting on an action part of the six-axis force sensor of the first preferred embodiment.
Figure 5:
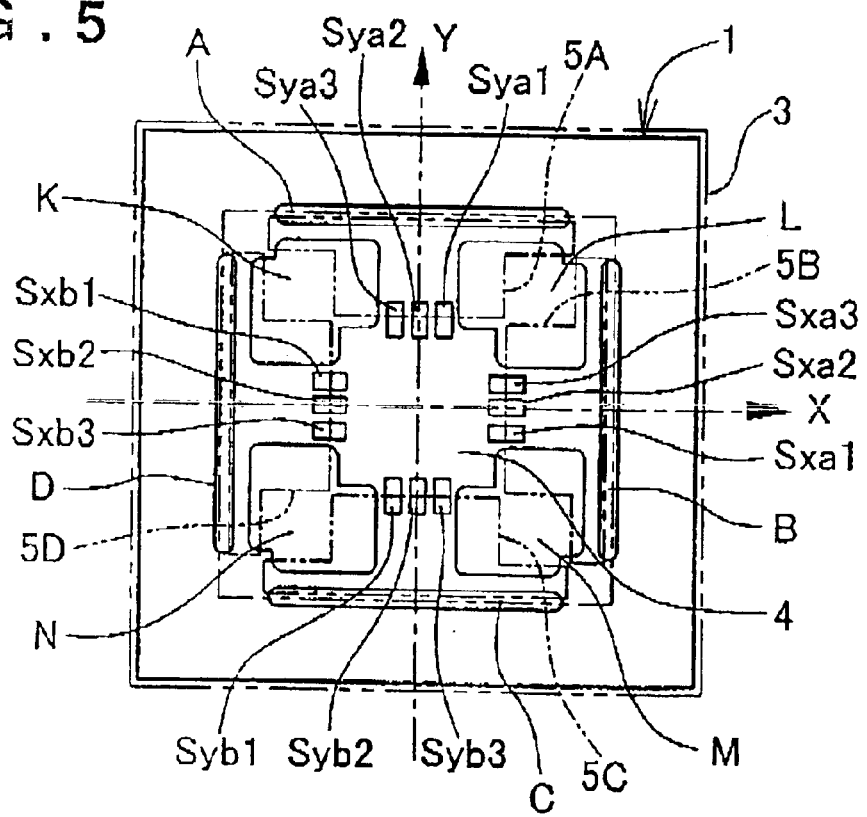
FIG. 5 is a plan layout view showing positions of strain resistance devices formed on the surfaces of connecting parts (5A–5C) of the six-axis force sensor of the first preferred embodiment.

As shown clearly in FIG. 1, FIG. 4 and FIG. 5, the semiconductor substrate 2 has holes A, B, C, D, X, L, M and N formed passing through it in the thickness direction of the substrate. The internal corners of the holes A, B, C, D, K, L, M and N are each worked to a circular arc shape. The sensor chip 1 is functionally divided by the holes A, B, C, D, K, L, M and N into multiple regions. The sensor chip 1 is made up of the action part 4, which is centrally positioned and substantially square in shape; a square frame-shaped support part 3, positioned around the action part 4; and the four T-shaped connecting parts 5A, 5B, 5C and 5D, which are positioned between the action part 4 and the support part 3 at their respective four side parts and connect the two together. An outside force is applied to the action part 4. The four connecting parts 5A to 5D each form a T-bridge, respectively having a bridge part 5Aa and an elastic part 5Ab, a bridge part 5Ba and an elastic part 5Bb, a bridge part 5Ca and an elastic part 5Cb, and a bridge part 5Da and an elastic part 5Db. The elastic parts 5Ab, 5Bb, 5Cb and 5Db of the connecting parts 5A to 5D border the regions A, B, C, D respectively and are each connected to the support part 3 at both of their ends. The bridge parts 5Aa, 5Ba, 5Ca and 5Da of the connecting parts 5A to 5D each have one end (the inner end) connected to one side of the substantially square action part 4 and the other end (the outer end) connected to the respective elastic part. The connecting parts, each made up of a bridge part and an elastic part; the joining portions between the connecting parts and the action part; and the joining portions between the connecting parts and the support part, are formed integrally as the semiconductor substrate 2.

The joining portions between the bridge parts 5Aa, 5Ba, 5Ca and 5Da, the elastic parts 5Ab, 5Bb, 5Cb and 5Db and the action part 4 are each worked, preferably R-worked, to a circular arc shape, to distribute stress caused by the external force applied to the action part 4 and thereby give them strength with respect to the applied external force. Specifically, for example the parts having an internal 90° angle are R-worked to R0.1 (radius 0.1 mm)

In the example shown in FIG. 1, in the semiconductor substrate 2 the connecting parts 5 are formed into a T-shape (T-shaped beam) by the holes A, B, C, D, K, L, M and N. However, as long as the required elastic function is fulfilled, the connecting parts 5 can be made some other shape, for example a Y-shape or the like.

The resistance devices Sya1, Sya2 and Sya3 are formed on the connecting part 5A near the joining portion between the action part 4 and the bridge part 5Aa. That is, they are disposed on the surface of the part of the connecting part 5A where strain caused by the external force applied to the action part 4 arises the most. The resistance devices Sya1, Sya2 and Sya3 are formed so that they line up in the width direction of the bridge part 5Aa and the long axis direction of each is parallel with the long axis direction of the bridge part 5Aa.

The other resistance devices Syb1–Syb3, Sxa1–Sxa3 and Sxb1–Sxb3 are formed respectively near the joining portions between the action part 4 and the bridge part 5Ca, the action part 4 and the bridge part 5Ba, and the action part 4 and the bridge part 5Da, similarly to the resistance devices Sya1–Sya3.

Figure 2:
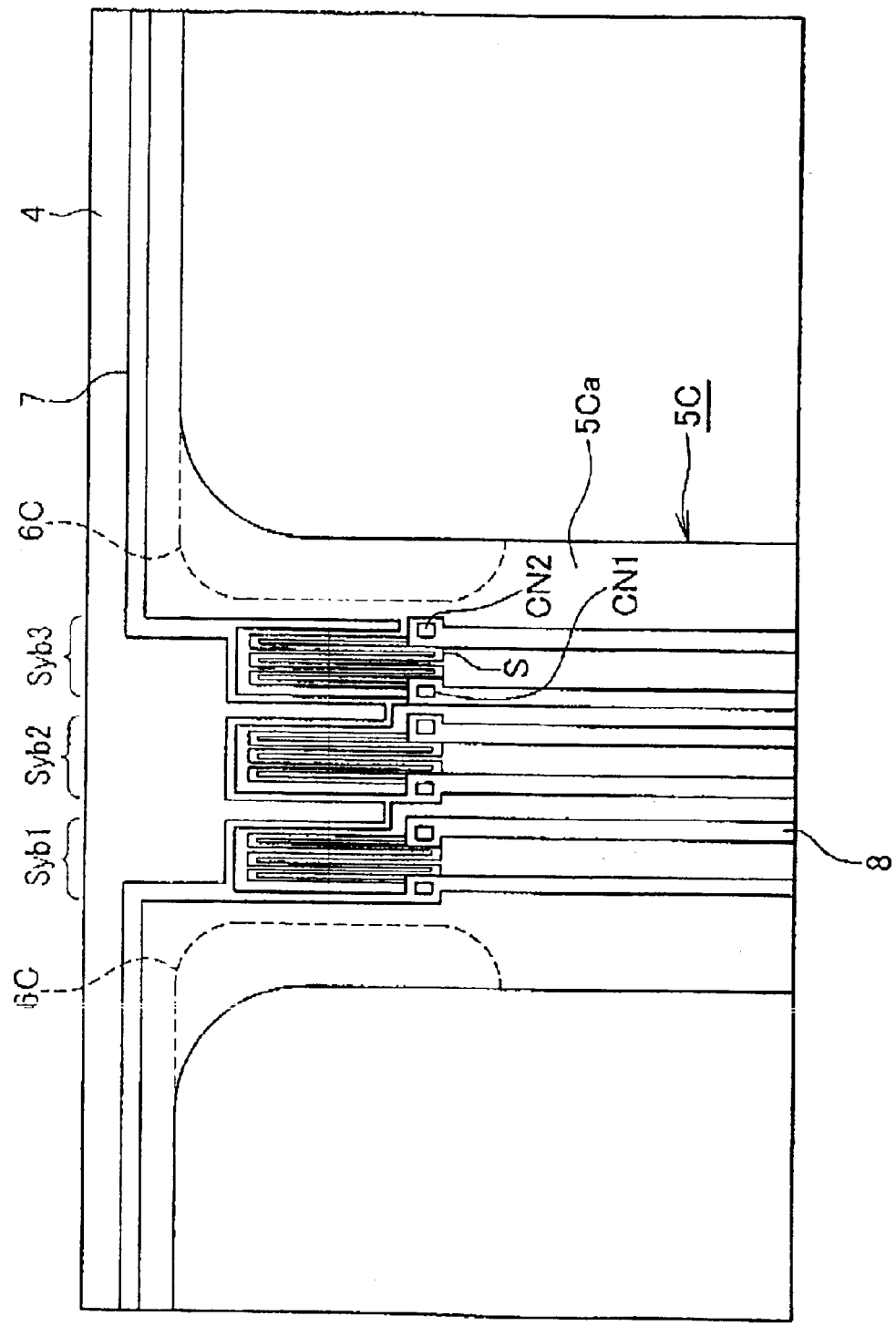
FIG. 2 is an enlarged detail view of a connecting part (5C) of the six-axis force sensor of the first preferred embodiment.

As shown in FIG. 2, resistance devices Syb1 to Syb3 each consisting of an active layer S extending in the long axis direction of the bridge part 5Ca are formed near the joining portion between the connecting part 5C and the action part 4. In the positional relationships of the resistance devices Syb1 to Syb3, the resistance device Syb2 is disposed in the center (on the centerline of the action part 4) of the bridge part 5Ca, and the resistance devices Syb1 and Syb3 positioned on either side of it are disposed in positions symmetrical about the resistance device Syb2 at the bridge part 5Ca.

Here, to form the resistance devices compactly in a small area, the active layer S forming each of the resistance devices is formed doubling back on itself several times so that its overall length is long. However, the shape of the resistance devices is not limited to the shape shown in the drawings.

Also, narrowed parts 6C can be formed, by removing the portions shown with dashed lines in FIG. 2. That is, with the purpose of concentrating the strain caused by the application of the external force, narrowed parts 6C, 6A, 6B and 6D can be formed in the bridge part 5Ca and the other bridge parts 5Aa, 5Ba and 5Da. Although these narrowed parts may be formed anywhere on the bridge parts, it is desirable that they be formed at the joining portions between the bridge parts and the action part 4.

When narrowed parts 6C are formed as shown in FIG. 2, the resistance devices Syb1 to Syb3 are each made by forming a respective active layer S in the area between the narrowed parts 6C. Also, irrespective of whether narrowed parts 6C are provided or not, the active layers S each have one end connected by a contact CN1 to a GND (ground) interconnection 7 as resistance device and the other end connected by a contact CN2 to a signal interconnection 8.

The GND interconnections 7 are formed so as to lie between the signal interconnections 8 leading from the resistance devices Syb1, Syb2 and Syb3 and so as to also surround the respective active layers S of the resistance devices Syb1, Syb2 and Syb3. As a result of the resistance devices and the signal interconnections 8 being isolated by means of the GND interconnections 7 like this, in the detection of currents from the resistance devices, the GND interconnections 7 prevent disturbances caused by high-frequency noise in the environment. Also, because this isolating structure shields against crosstalk noise from other resistance devices and their signal interconnections, it makes it possible to raise the S/N ratio of current measurement of the resistance changes arising from piezoelectric effect in the resistance devices.

Although in this preferred embodiment one end of each resistance device is connected to a ground potential, depending on the measurement method it may be that the resistance devices are not connected to a ground potential. In this case, it is necessary for a GND interconnection dedicated for use as a guard to be provided separately from the signal lines of the resistance devices and for this GND interconnection to be connected to a ground potential independently.

Returning now to FIG. 1, this FIG. 1 will be explained further. The multiple GND interconnections 7 are connected to GND electrodes 9 formed on the surface of the support part 3. The GND electrodes 9 are connected to a GND interconnection 11 formed on the surface of the periphery of the support part 3. A ground potential from an external power supply (not shown) is impressed on the GND electrodes 9 and the GND interconnection 11.

The signal interconnections 8 are severally connected to signal electrodes 10 formed on the surface of the periphery of the support part 3. The signal electrodes 10 are electrodes for performing measurement of the resistance values of the resistance devices and are connected to an outside measuring instrument or device for analyzing the applied external force (not shown).This measuring instrument or analyzing device measures the resistance values from current-voltage characteristics and obtains resistance change proportions of the resistance devices resulting from the applied force.

A bias electrode 12 is an electrode for impressing a bias voltage on the semiconductor substrate 2 and is supplied with a predetermined voltage from the external power supply. A bias voltage impressed by way of this bias electrode 12 grows a depletion layer at the interfaces with the active layers S. This depletion layer effects insulation between the active layers S and the semiconductor substrate 2 and between adjacent active layers S and so prevents leakage currents arising there and reduces influences of current noise. Also, keeping the semiconductor substrate 2 electrically at a fixed potential prevents potential dispersion and improves noise tolerance and makes it possible for resistance changes based on piezoelectric effect corresponding to strains of the resistance devices formed on the bridge parts 5Aa, 5Ba, 5Ca, 5Da to be measured with high precision.

Resistance devices 13 are provided to effect temperature compensation. One end of each of the resistance devices 13 is connected by an interconnection to the GND interconnection 11, and the other end is connected by an interconnection to an electrode 14. A predetermined voltage is impressed on the electrodes 14, and on the basis of the current flowing here the ratio of the resistance value of the resistance device 13 to its resistance value at room temperature is obtained. By means of this resistance value ratio and on the basis of the ambient temperature, compensation of the resistance values of the resistance devices formed on the bridge parts 5Aa, 5Ba, 5Ca, 5Da is carried out. That is, by correcting the measured results of resistance change of the resistance devices for external force measurement on the basis of the resistance change of the resistance device 13, which is not subject to the influence of the external force, it is possible to measure forces and moments without the results being influenced by the surrounding temperature.

As described above, the sensor chip or six-axis force sensor 1 is made up of an action part 4 to which an external force is applied, a support part 3 fixed to an external part, and four T-shaped connecting parts 5A, 5B, 5C and 5D disposed around the action part 4. The connecting parts 5A, 5B, 5C and 5D are made up of elastic parts 5Ab, 5Bb, 5Cb and 5Db, each connected at two locations to the support part 3, and bridge parts 5Aa, 5Ba, 5Ca and 5Da, each connected to the action part 4.

In the six-axis force sensor 1, when strains arise in the resistance devices formed on the bridge parts 5Aa, 5Ba, 5Ca, 5Da due to an external force applied to the action part 4, the elastic parts 5Ab, 5Bb, 5Cb and 5Db prevent the occurrence of strain over the whole semiconductor substrate 2 caused by this external force on the basis of the relationships of forces acting between the action part 4 and the bridge parts 5Aa, 5Ba, 5Ca, 5Da. Consequently, with this six-axis force sensor 1, a selective strain pertaining to a force or moment in a specified direction can be made to arise in each of the resistance devices, and an external force applied to the action part 4 can be separated into individual force and moment components.

Figure 3:
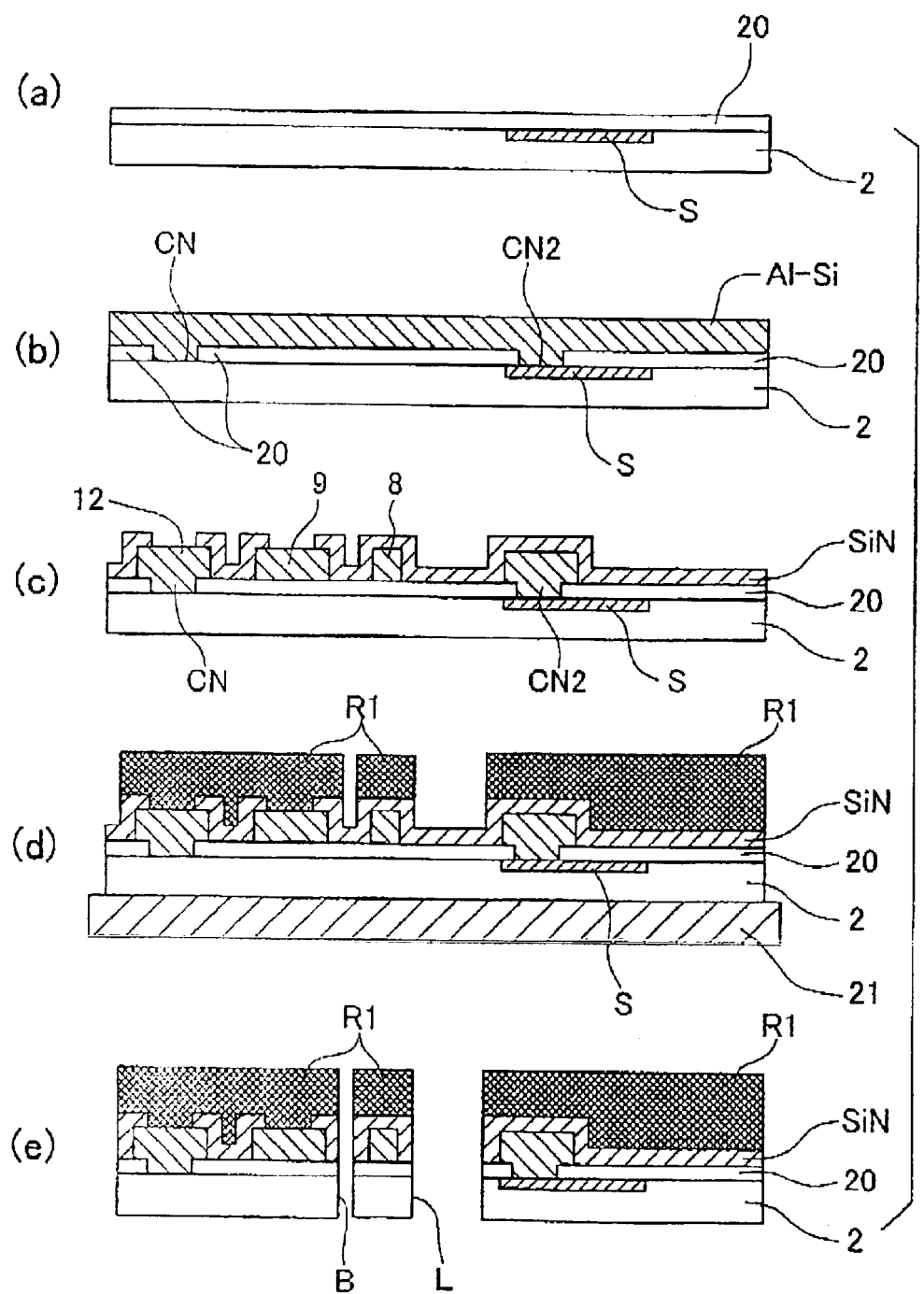
FIGS. 3(a) through (e) are sectional views of the six-axis force sensor of the first preferred embodiment at different stages in a manufacturing process.

Next, an example of a method for manufacturing the sensor chip 1 will be described, with reference to FIGS. 3(a) through (e). In FIG. 3(a), boron, a p-type impurity, is ion-implanted into a semiconductor substrate 2 consisting of n-type (100) silicon using as a mask a resist pattern (not shown) for resistance device formation formed by photolithography. The resistance devices formed on the surface of the semiconductor substrate 2 are the above-mentioned strain resistance devices Sya1–Sya3, Syb1–Syb3, Sxa1–Sxa3, Sxb1–Sxb3 and the resistance devices 13.

The resist pattern is then removed, and by p-CVD (plasma Chemical Vapor Deposition) a silicon oxide film is grown as an interlayer insulation film 20. Then, by heating the semiconductor substrate 2, the implanted boron ions are activated to form the active layers S. Here, for example the thickness of the semiconductor substrate 2 is 525 $\mu$m and the thickness of the interlayer insulation film 20 is 300 nm. The resistance value of the resistance devices is 53Ω.

Referring now to FIG. 3(b), a resist pattern (not shown) for forming contact holes is formed, and with this resist pattern as a mask the interlayer insulation film 20 where contact holes are to be formed is removed using BHF (Buffered Hydrofluoric acid). The resist pattern is then removed, Al—Si (an alloy of aluminum and silicon) is sputtered to a thickness of about 1 $\mu$m over the entire surface of the semiconductor substrate 2, and a heat-treatment for forming an ohmic junction is carried out.

In this way, a contact CN between a bias electrode 12 and the semiconductor substrate 2, and contacts CN2 (and the contacts CN1 shown in FIG. 2) of the active layers S are formed.

Next, in FIG. 3(c), a resist pattern (not shown) for forming the GND interconnections 7 and 11, the signal interconnections 8, the other interconnections, and the electrodes 9, 10, 12 and 14 is formed by photolithography, and unnecessary areas of metal are removed by wet etching to pattern the interconnections and electrodes. The resist pattern is then removed, and a SiN film (silicon nitride film) is formed by p-CVD as a passivation film.

A resist pattern (not shown) for bonding pad formation is then formed, and the SiN film in areas to become openings for the electrodes 9, 10, 12 and 14 is removed.

Next, as shown in FIG. 3(d), a resist pattern R1 to form the holes A, B, C, D, X, L, M and N shown in FIG. 1 and to facilitate sensor chip separation is formed. Then, using wax, the semiconductor substrate 2 is affixed to a dummy wafer 21.

Referring now to FIG. 3(e), by RIE (Reactive Ion Etching), the semiconductor substrate 2 at openings in the resist pattern R1 is removed to form the through holes A, B, C, D, K, L, H and N and to perform sensor chip separation (cut out individual sensor chips 1 from the wafer). Then, by means of an organic solvent, the resist pattern is removed, the wax is dissolved, and the dummy wafer 21 is detached from the semiconductor substrate 2. Finally, washing is carried out and the sensor chip, that is, the six-axis force sensor 1, is completed.

Although in the process described above an impurity was introduced into the semiconductor substrate 2 by ion-implantation, thermal diffusion may alternatively be used to introduce the impurity. Although sputtering was employed as the method for depositing the metal film, a vapor deposition method, anticipating lift-off, may alternatively be used.

As described above, in the sensor chip 1, because semiconductor resistance devices for detecting strain are formed in the surface of a semiconductor substrate using photolithography processes, the resistance devices can be disposed exactly in the required positions. Accordingly, devices with the performance specified for them in design can be manufactured easily with good reproducibility, and productivity is also improved. As a result, compared to a related art multi-axis force sensor manufactured by a process involving an affixing step, size reduction of a six-axis force sensor 1 according to this preferred embodiment is easy, and its reproducibility and manufacturability are also excellent.

Also, because the six-axis force sensor 1 has a construction wherein resistance devices are formed on a semiconductor substrate 2, the sensor can be made small and thin. The manufacturing method of the six-axis force sensor 1 is such that the resistance devices can be reduced in size to the resolution limit of photolithography. Thus a six-axis force sensor can be made smaller and thinner and it is possible to realize a six-axis force sensor with a reduced influence of other axis interference.

Next, the detection/measurement operation of this sensor chip 1 constituting a six-axis force sensor will be explained. First, the principle of detection/measurement of six components of force and moment resulting from an external force applied to the sensor chip 1 will be explained using FIG. 4 through FIG. 11.

Here, with reference to FIG. 4 and FIG. 5, definitions for illustrating the external force detection principle of the sensor chip 1 will be explained. FIG. 4 is a simplified perspective view of the sensor chip 1, and FIG. 5 is a simplified plan view of the sensor chip 1. The sensor chip 1, which is a semiconductor sensor device, is square in plan and shaped like a flat plate. The sensor chip 1 is made up of a central action part 4, a support part 3 surrounding the action part 4, and four connecting parts 5A, 5B, 5C and 5D positioned between the action part 4 and the support part 3. Each of the four connecting parts 5A to 5D is a T-shaped beam and has a bridge part and an elastic part. As described above, each of the four connecting parts 5A to 5D has disposed on one face thereof, near its boundary with the action part 4, three strain resistance devices (Sxa1, Sxa2, Sxa3), (Sxb1, Sxb2, Sxb3), (Sya1, Sya2, Sya3) or (Syb1, Syb2, Syb3).

In FIG. 4 and FIG. 5, with respect to the sensor chip 1, orthogonal X, Y and Z axes are shown. In FIG. 4, upper, lower, left and right sides of the sensor chip 1 are set for convenience. In FIG. 5, the horizontal axis is shown as the X-axis and the vertical axis is shown as the Y-axis. Also, in FIG. 4, a force and a moment pertaining to each axis are represented with arrows and reference letters. With respect to the three orthogonal coordinate axes (X-axis, Y-axis, Z-axis), a force in the X-axis direction is denoted Fx; a force in the Y-axis direction Fy; and a force in the Z-axis direction Fz. Similarly, a moment acting about the X-axis is denoted Mx; a moment acting about the Y-axis My; and a moment acting about the Z-axis Mz.

Figure 6:
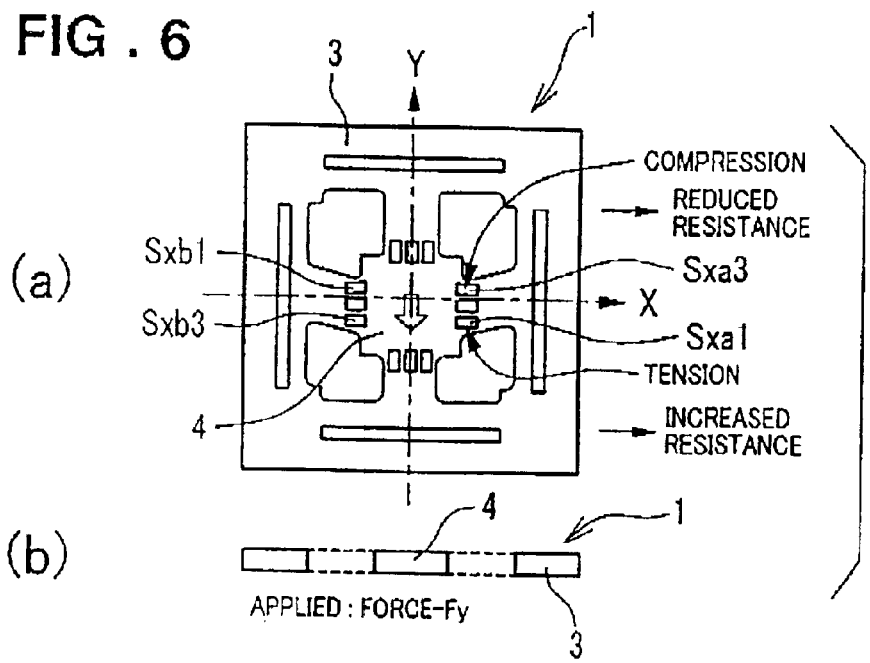
FIGS. 6(a) and (b) are a plan view and a sectional view showing a state of deformation arising when a force –Fy is applied in a Y-axis direction to the action part of the six-axis force sensor (sensor chip) of the first preferred embodiment.
Figure 7:
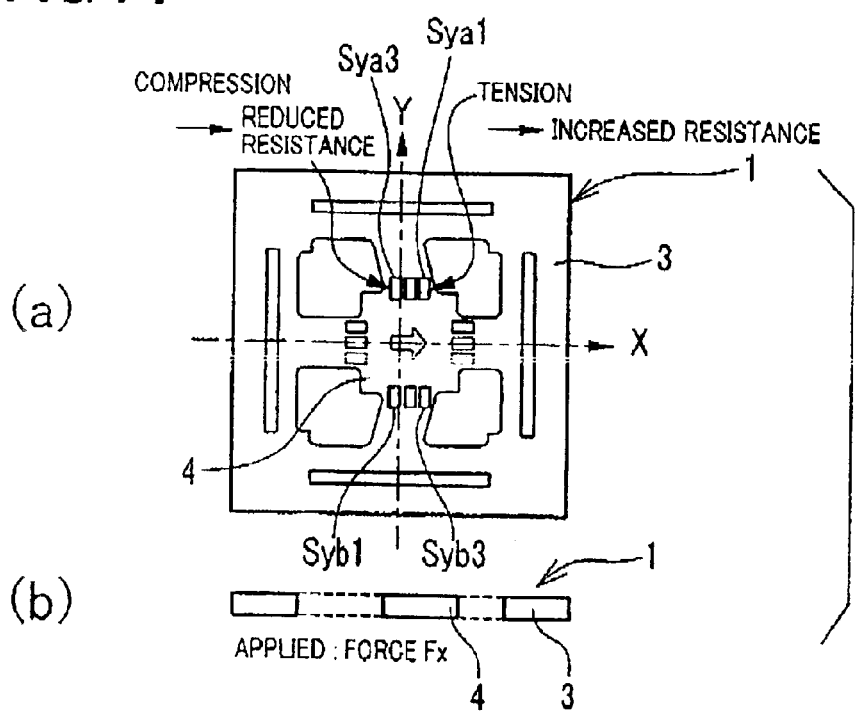
FIGS. 7(a) and (b) are similar views showing a state of deformation arising when a force Fx is applied in an X-axis direction to the action part of the six-axis force sensor (sensor chip) of the first preferred embodiment.
Figure 8:
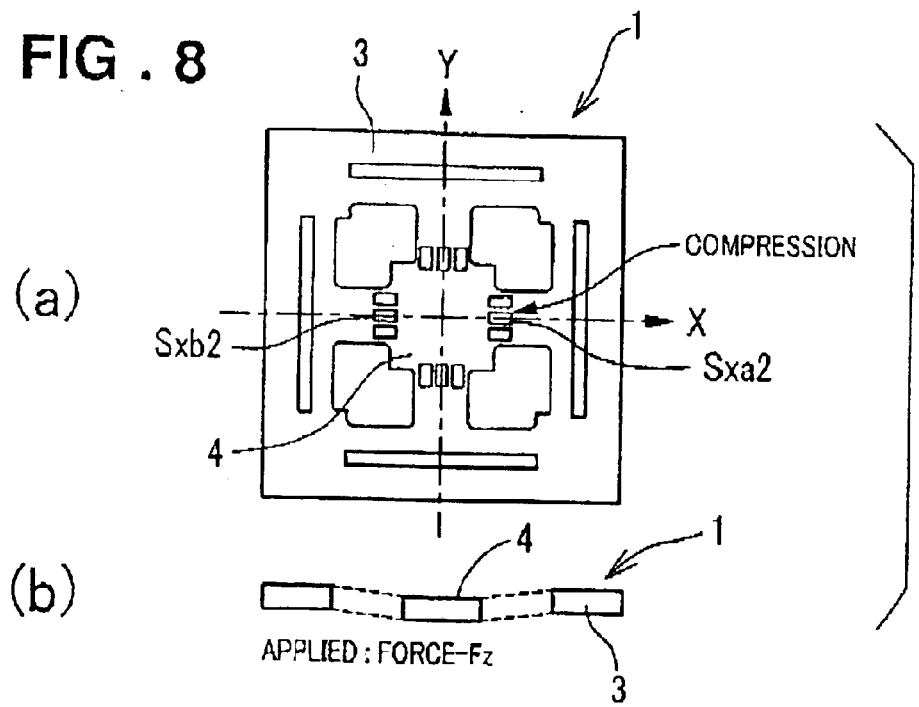
FIGS. 8(a) and (b) are similar views showing a state of deformation arising when a force –Fz is applied in a Z-axis direction to the action part of the six-axis force sensor (sensor chip) of the first preferred embodiment.
Figure 9:
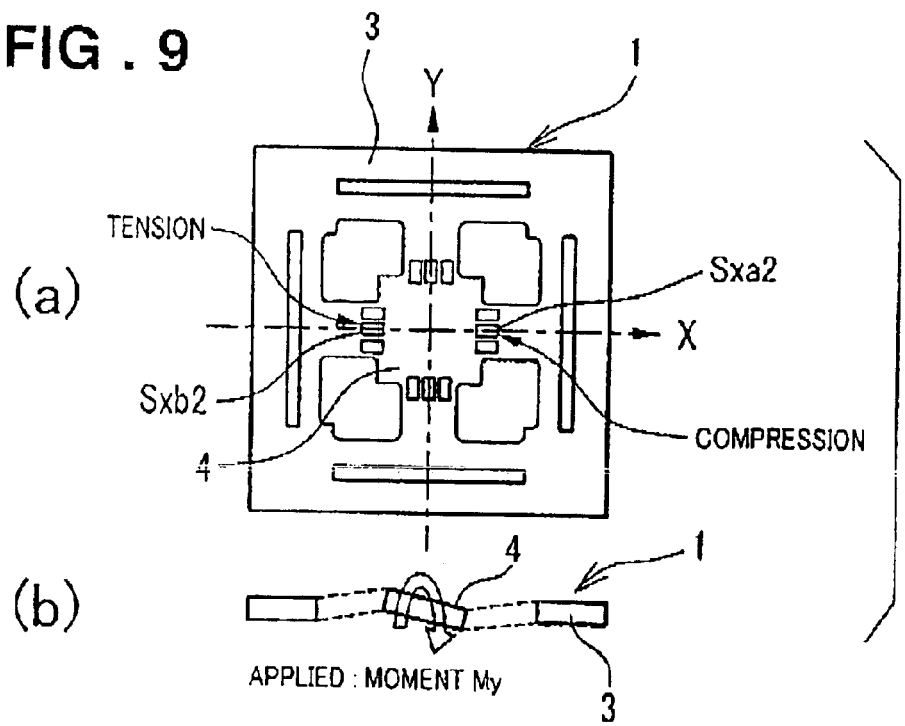
FIGS. 9(a) and (b) are similar views showing a state of deformation arising when a moment My is applied about the Y-axis direction to the action part of the six-axis force sensor (sensor chip) of the first preferred embodiment.
Figure 10:
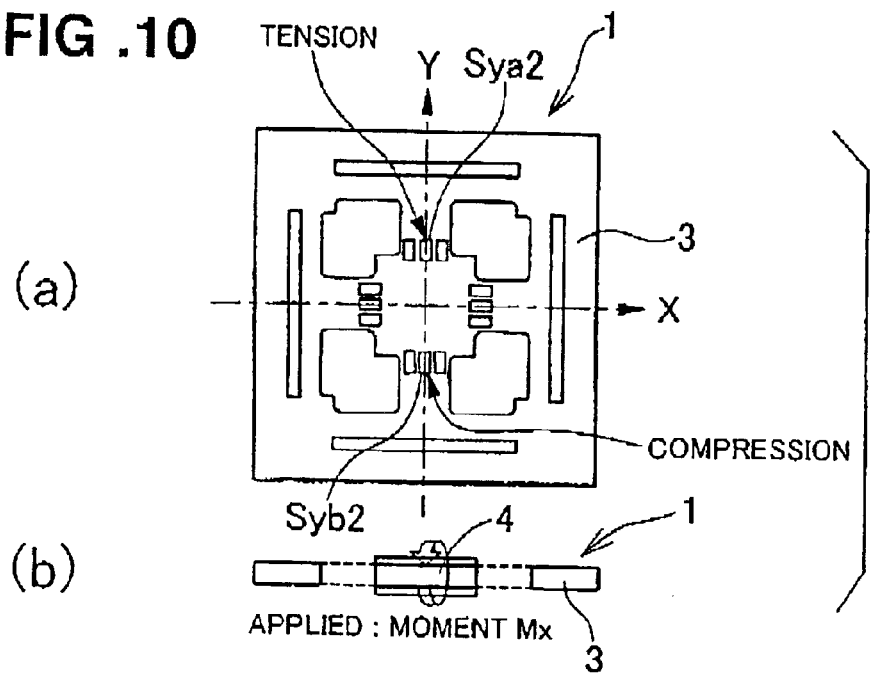
FIGS. 10(a) and (b) are similar views showing a state of deformation arising when a moment Mx is applied about the X-axis direction to the action part of the six-axis force sensor (sensor chip) of the first preferred embodiment.
Figure 11:
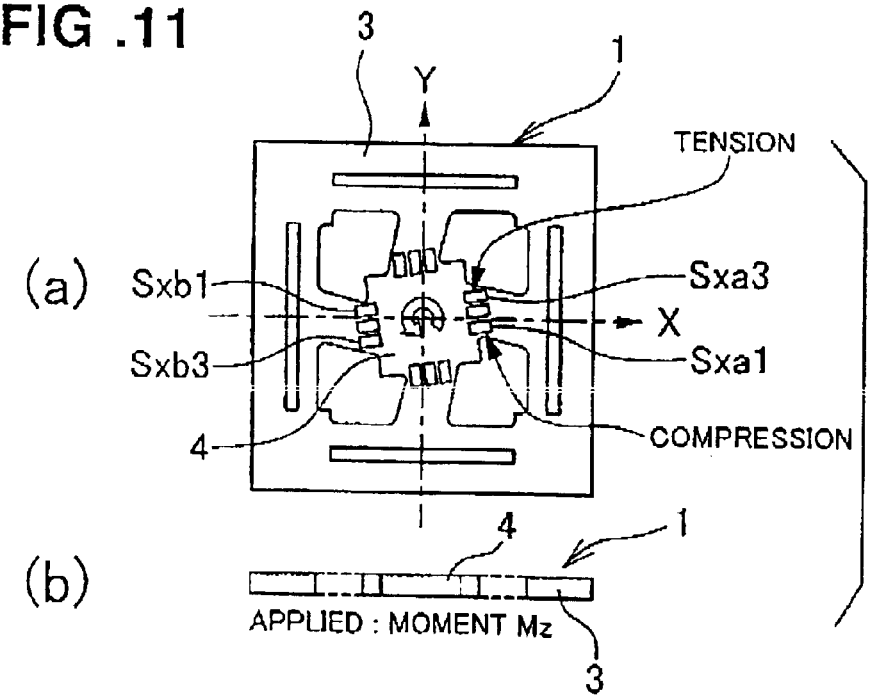
FIGS. 11(a) and (b) are similar views showing a state of deformation arising when a moment Mz is applied about the Z-axis direction to the action part of the six-axis force sensor (sensor chip) of the first preferred embodiment.

Next, with reference to FIG. 6(a) through FIG. 11(b), typical axis forces (forces and moments) on the sensor chip 1, and variations, will be discussed specifically. FIG. 6(a) is a plan view of the obverse side of the sensor chip 1 in a deformed state, and FIG. 6(b) is a corresponding cross-sectional view, showing a state of deformation or displacement of the action part 4 of the sensor chip 1. The pairs of FIGS. 7(a), (b) through FIGS. 11(a), (b) are also plan and cross-sectional views similar to those of FIGS. 6(a) and (b).

In FIGS. 6(a) and (b), a force –Fy is being applied to the action part 4 of the sensor chip 1 along the Y-axis, downward from centrally above. Consequently, a strain arises in each of the joining portions between the connecting parts 5B, 5D and the action part 4, and in the joining portions between the connecting parts 5A and 5C and the action part 4 the force –Fy is absorbed by the elastic parts of the connecting parts and the occurrence of strain is suppressed. At this time, in each of the strain resistance devices Sxa3 and Sxb1 a compressive strain arises and the resistance value falls; in Sxa1 and Sxb3 a tensile strain arises and the resistance value rises; and in Sya1–Sya3 and Syb1–Syb3 the change in resistance value is extremely small.

In FIGS. 7(a) and (b), a force Fx is being applied to the action part 4 of the sensor chip 1 along the X-axis, rightward from centrally on the left. Consequently, a strain arises in each of the joining portions between the connecting parts 5A, 5C and the action part 4, and in the joining portions between the connecting parts 5B and 5D and the action part 4 the force Fx is absorbed by the elastic parts of the connecting parts and the occurrence of strain is suppressed. At this time, in each of the strain resistance devices Sya3 and Syb1 a compressive strain arises and the resistance value falls; in Sya1 and Syb3 a tensile strain arises and the resistance value rises; and in Sxa1–Sxa3 and Sxb1–Sxb3 the change in resistance value is extremely small.

In FIGS. 8(a) and (b), a force –Fz is being applied to the action part 4 of the sensor chip 1 along the Z-axis (perpendicular to the plane of the paper). Consequently, a strain arises in each of the joining portions between the connecting parts 5A–5D and the action part 4. At this time, in all of the strain resistance devices the same compressive strain arises and the resistance value falls.

In FIGS. 9(a) and (b), a moment My is being applied to the action part 4 of the sensor chip 1 about the Y-axis in the direction of the arrow. Consequently, a strain arises in each of the joining portions between the connecting parts 5B, 5D and the action part 4, and in the joining portions between the connecting parts 5A, 5C and the action part 4 the moment My is absorbed by the elastic parts of the connecting parts and the occurrence of strain is suppressed. At this time, in each of the strain resistance devices Sxa1–Sxa3 a compressive strain arises and the resistance value falls; in Sxb1–Sxb3 a tensile strain arises and the resistance value rises; and in Sya1–Sya3 and Syb1–Syb3 the change in resistance value is extremely small.

In FIGS. 10(a) and (b), a moment Mx is being applied to the action part 4 of the sensor chip 1 about the X-axis in the direction of the arrow. Consequently, a strain arises in each of the joining portions between the connecting parts 5A, 5C and the action part 4, and in the joining portions between the connecting parts 5B, 5D and the action part 4 the moment Mx is absorbed by the elastic parts of the connecting parts and the occurrence of strain is suppressed. At this time, in each of the strain resistance devices Syb1–Syb3 a compressive strain arises and the resistance value falls; in Sya1–Sya3 a tensile strain arises and the resistance value rises; and in Sxa1–Sxa3 and Sxb1–Sxb3 the change in resistance value is extremely small.

In FIGS. 11(a) and (b), a moment Mz is being applied to the action part 4 of the sensor chip 1 about the Z-axis in the direction of the arrow (counterclockwise). Consequently, a strain arises in each of the joining portions between the connecting parts 5A–5D and the action part 4. At this time, in each of the strain resistance devices Sya1, Sxb1, Syb1, Sxa1 a compressive strain arises and the resistance value falls, and in Sya3, Sxb3, Syb3, Sxa3 a tensile strain arises and the resistance value rises.

Next, a prototype example of the six-axis force sensor 1 will now be described. Parameters of the constituent parts of a six-axis force sensor 1 actually made will be shown.

A semiconductor substrate 2 forming the six-axis force sensor (sensor chip 1) was a P(phosphorus)-doped n-type silicon substrate, and its resistivity was 1 Ωcm. The semiconductor substrate 2 was an n-type (100) silicon substrate, and p-type active layers S constituting the resistance devices were formed with their long axes directions parallel with either the <011> direction or the <0-11> direction. The sheet resistance (ρ) of the active layers S, which were formed by ion-implantation, was 500 [Ω/□], and the resistance devices Sxa1–Sxa3, Sya1–Sya3, Sxb1–Sxb3, Syb1–Syb3 of this trial six-axis force sensor 1 were formed with a resistance value of 53 kΩ.

FIGS. 12(a) through (c) show the shapes and dimensions of the constituent parts of this prototype example of the six-axis force sensor 1. The dimensions shown in FIGS. 12(a) through (c) are all in millimeters. FIG. 12(a) is a plan view. The chip dimensions of the semiconductor substrate 2, i.e. the six-axis force sensor 1, are 10 mm×10 mm, and the size of the action part 4 is 3 mm×3 mm. Bridge parts 5Aa, 5Ba, 5Ca and 5Da of width 0.4 mm and length 1.325 mm are formed extending from the centers of the sides of the action part 4 to the support parts 3 opposite.

The holes A, B, C and D are formed with dimensions of width 0.2 mm, length 5.25 mm. The elastic parts 5Ab, 5Bb, 5Cb and 5Db are also formed with dimensions of width 0.2 mm and length 5.25 mm, and each has one end of the respective bridge part 5Aa, 5Ba, 5Ca or 5Da connected to it at its center.

FIG. 12(b) shows the positional relationships in which the resistance devices (Sxa1–Sxa3, Sya1–Sya3, Sxb1–Sxb3 and Syb1–Syb3) are formed. In the figure, the resistance devices Sya1–Sya3 formed at the joining portion between the bridge part 5Aa and the action part 4 are shown. The resistance devices Sya1–Sya3 are disposed near the joining portion between the bridge part 5Aa and the action part 4 with a width of 0.07 mm and at a pitch of 0.07 mm.

As shown in FIG. 12(c), each of the resistance devices consists of four 0.3 mm lengths of an active layer S of width 0.01 mm, formed at a pitch of 0.01 mm in an area of width 0.07 mm.

Returning to FIG. 12(b), the resistance devices Sya1–Sya3 are disposed at the joining portion between the bridge part 5Aa and the action part 4 with the long axis directions of their active layers S parallel with the long axis direction of the bridge part 5Aa. These resistance devices Sya1–Sya3 are disposed with their long axis direction centers in a position level with the side of the action part 4 (they are formed extending 0.15 mm above and below the side of the action part 4). The resistance device Sya2 is disposed in the center of the short axis direction of the bridge part 5Aa, and the resistance devices Sya1 and Sya3 are formed with their outer sides, which do not face the sides of the Sya2, in positions 0.025 mm from the short axis direction ends (in other words the sides) of the bridge part 5Aa.

The resistance devices Sxa1–Sxa3, Sxb1–Sxb3 and Syb1–Syb3 formed at the joining portions between the bridge parts 5Ba, 5Ca and 5Da and the action part 4 are also formed with similar disposition and dimensions to the resistance devices Sya1–Sya3 discussed above.

Next, the sensor characteristics with which force and moment components applied to the six-axis force sensor 1 are detected will be discussed.

When the six axis components (axis forces) mentioned above, i.e. Fx[N], Fy[N], Fz[N], Mx[N.cm], My[N.cm], Mz[N.cm], are applied to the six-axis force sensor 1 on its own, the relationship between these six axis components and the detection signals from the six-axis force sensor 1 is as follows.

An actual six-axis force sensor is made up of a sensor chip 1 and an external measuring device for computing signals pertaining to the resistance change proportions obtained from the twelve resistance devices of the sensor chip 1, and is constructed as a six-axis force sensor apparatus. The signals (computed resistance change proportions) finally outputted from the six-axis force sensor via the computation of the external measuring device are the six signals Sig1, Sig2, Sig3, Sig4, Sig5 and Sig6. If the values of the resistance change proportions obtained from the twelve resistance devices Sxa1–Sxa3, Sya1–Sya3, Sxb1–Sxb3 and Syb1–Syb3 of the sensor chip 1 are expressed R'Sxa1, R'Sxa2, R'Sxa3, R'Sya1, R'Sya2, R'Sya3, R'Sxb1, R'Sxb2, R'Sxb3, R'Syb1, R'Syb2, R'Syb3, then the above-mentioned six signals Sig1–Sig6 can be determined on the basis of the following formulas.

$$Sig1 = ((R'Sya1 - R'Sya3) + (R'Syb3 - R'Syb1))/4 \quad (1)$$

$$Sig2 = ((R'Sxa3 - R'Sxa1) + (R'Sxb1 - R'Sxb3))/4 \quad (2)$$

$$Sig3 = (R'Sxa2 + R'Sya2 + R'Sxb2 + R'Syb2)/4 \quad (3)$$

$$Sig4 = (R'Sya2 - R'Syb2)/2 \quad (4)$$

$$Sig5 = (R'Sxb2 - R'Sxa2)/2 \quad (5)$$

$$Sig6 = ((R'Sxa3 - R'Sxa1) + (R'Sya3 - R'Sya1) + (R'Sxb3 - R'Sxb1) + (R'Syb3 - R'Syb1))/8 \quad (6)$$

The six output signals Sig1–Sig6 of the six-axis force sensor determined according to the above formulas (1)–(6) on the basis of the resistance change proportions of the twelve resistance devices and the six axis components Fx, Fy, Fz, Mx, My, Mz applied to the sensor chip 1, when the relationships between the two are obtained experimentally by finding the output signals of the six-axis force sensor corresponding to specific axis force components, can be related by the matrix table shown in FIG. 13. FIG. 13 shows relationships between the forces Fx, Fy, Fz and the moments Mx, My, Mz applied to the action part 4 and the computed resistance change proportions Sig1–Sig6 per unit (of force of moment). In FIG. 13, the area 100 on the left side shows the above-mentioned signals Sig1–Sig6 and the formulas (1)–(6). FIG. 13 was obtained by experimental measurements.

The above-mentioned formulas (1)–(6) are made up of resistance change proportions of resistance devices extended (subjected to tension) and resistance devices compressed by strains arising in the joining portions between the bridge parts and the action part by an application of an external force.

As is clear from the matrix of FIG. 13, the resistance devices used in the formulas (1)–(6) are selected so that the non-diagonal components of the matrix either are "0" or are small numbers compared with the diagonal components 200. That is, the formulas (1)–(6) are composed with selected resistance devices to so perform the computation of the computed resistance change proportions that when the force or moment of a certain axis is measured, to prevent other axis interference, resistance change proportions pertaining to the forces and moments of the other axes cancel each other out.

Looking at formula (1), which corresponds to the application of a force Fx, when Fx is applied, because a tensile stress is applied to each of the resistance devices Sya1 and Syb3 and a compressive stress is applied to each of the resistance devices Sya3 and Syb1, as shown by the matrix element with the reference number 201 in FIG. 13 the computed resistance change proportion is 0.00431(1/N) per unit Fx.

Still looking at this formula (1) corresponding to the application of a force Fx, when a force Fy is applied, a tensile stress is applied to both the resistance device Sya1 and the resistance device Sya3 and a compressive stress is applied to both the resistance device Syb3 and the resistance device Syb1, and consequently the resistance change proportions R'Sya1 and R'Sya3 and the resistance change proportions R'Syb3 and R'Syb1 cancel each other out. As a result, when Fy is applied, the computed resistance change proportion Sig1 is theoretically "0" in formula (1).

When in formula (1) a force Fz is applied, a tensile stress acts on all of the resistance devices Sya1, Sya3, Syb3 and Syb1, and again the computed resistance change proportion Sig1 given by formula (1) is theoretically "0".

When in formula (1) a moment Mx is applied, a tensile stress is applied to both the resistance device Sya1 and the resistance device Sya3 and a compressive stress is applied to both the resistance device Syb3 and the resistance device Syb1, and again the computed resistance change proportion Sig1 in formula (1) is theoretically obtained as "0".

When in formula (1) a moment My is applied, because a compressive stress acts on the resistance devices Sya1 and Sya3 and a tensile stress acts on Syb3 and Syb1, the computed resistance change proportion Sig1 is not theoretically "0". However, because the elastic parts 5Ab and 5Cb absorb the strain to some extent, it is a small number compared to the value of the computed resistance change proportion of when there is an input Fx.

When in formula (1) a moment Mz is applied, a tensile stress is applied to both the resistance device Sya1 and the resistance device Syb1 and a compressive stress is applied to both the resistance device Sya3 and the resistance device Syb3, the resistance change proportions of these resistance devices cancel each other out as (R'Sya1–R'Sya3) and (R'Syb3–R'Syb1), and the computed resistance change proportion Sig1 in formula (1) is again theoretically obtained as "0".

When from these results an inverse matrix is obtained and the relationship between Fx and the computed resistance change proportions is found, as explained above, this relationship becomes substantially Fx=Sig1×[diagonal element 11] (corresponding to m'11 in the related art examples).

Because resistance devices are selected so that the values of the non-diagonal elements become "0" or very small compared with the diagonal elements and resistance change proportions of these resistance devices are used in the formula for obtaining the computed resistance change proportion Sig1 like this, the probability of other axis interference arising can be greatly reduced. And in the other formulas (2)–(6) also, the resistance devices used for measurement are similarly chosen so that the non-diagonal elements become "0" or become small with respect to the diagonal elements.

The kind of resistance change proportion canceling described above is possible because of the way that, on each of the bridge parts, twelve resistance devices are disposed in symmetrical positions on either side of a resistance device disposed centrally.

Here, in each of the formulas, the numerator is divided by the number of resistances used in the formula in order to standardize the resistance change proportions to a proportion of one resistance.

Results of obtaining computed resistance change proportions respective to the application of each of the force and moment components are shown in the table of FIG. 13. In the above-mentioned formulas (1)–(6), for the computed resistance change proportions Sig1, Sig2 and Sig3 computed resistance change proportions per 1N are obtained, and for the computed resistance change proportions Sig4, Sig5 and Sig6 computed resistance change proportions per 1 N.cm are obtained.

Here, the method by which the resistance change proportion of a resistance device on its own is obtained will be described. If for example the resistance value of the resistance device Sxa1 (under a stress) is written RSxa1, its resistance change proportion is written R'Sxa1, and the resistance value of the resistance device 13, which is the compensation resistance, is written Rcomp, then the true resistance value of the resistance device Sxa1 is 'RSxa1.Rcomp(0)/Rcomp'. Here, Rcomp(0) is the resistance value of the resistance device 13 at room temperature, and Rcomp is its resistance value at the ambient temperature.

The resistance change proportion R'Sxa1 is obtained by the following formula.

$$R'Sxa1=((RSxa1.Rcomp(0)/Rcomp)-Sxa1(0))/Sxa1(0)$$

Here, the resistance value Sxa1(0) is the resistance value of the resistance device Sxa1 when no stress is acting on the resistance device Sxa1.

Also for the other resistance devices Sxa2, Sxa3, Sxb1–Sxb3, Sya1–Sya3 and Syb1–Syb3, resistance change proportions R'Sxa2, R'Sxa3, R'Sxb1–R'Sxb3, R'Sya1–R'Sya3, R'Syb1–R'Syb3 can be obtained in the same way as the resistance change proportion R'Sxa1 of the resistance device Sxa1 above. The resistance values are obtained from current-voltage characteristics measured at the signal electrodes 10.

On the basis of the matrix table of FIG. 13 obtained by experimental measurement, an equation (7) for obtaining the forces and moments of an applied external force from the computed resistance change proportions Sig1–Sig6 measured by the six-axis force sensor 1 can be written.

$$\begin{pmatrix} +Fx[N] \\ +Fy[N] \\ +Fz[N] \\ +Mx[N\cdot cm] \\ +My[N\cdot cm] \\ +Mz[N\cdot cm] \end{pmatrix} = \begin{pmatrix} 231.7 & 0 & 0 & 0 & 6.3 & 0 \\ 0 & 231.7 & 0 & -6.3 & 0 & 0 \\ 0.1 & 0.2 & 146.4 & 1.1 & 1.1 & -1.7 \\ 0 & 1.0 & 0 & 23.6 & 0 & 0 \\ -1.0 & 0 & 0 & 0 & 23.6 & 0 \\ 0 & 0 & 0 & 0 & 0 & 84.2 \end{pmatrix} \times \begin{pmatrix} Sig1 \\ Sig2 \\ Sig3 \\ Sig4 \\ Sig5 \\ Sig6 \end{pmatrix} \quad (7)$$

The matrix that is the left term on the right side of equation (7) is obtained as the inverse matrix of the elements in the table of FIG. 13. That is, this inverse matrix is the matrix for obtaining the relationships between the computed resistance change proportions and the forces and moments axis by axis, and by applying the computed resistance change proportions Sig1–Sig6 to equation (7) it is possible to obtain force and moment components.

Because the non-diagonal elements in the matrix on the right side of equation (7) either are small values compared to the values of the diagonal elements or are "0", other axis interference among the axes is suppressed. That is, it is possible to construct a matrix showing a (computed resistance change proportion—force and moment) relationship which suppresses other axis interference so that for example when a force Fx is applied only the value of the force Fx is obtained as the computation result of formula (1).

Thus, compared to related art, in which there has tended to be a problem of reproducibility of measurement values due to other axis interference, with a six-axis force sensor 1 according to this invention it is possible to obtain a matrix showing a (computed resistance change proportion—force and moment) relationship wherein the non-diagonal elements either are "0" or take very small values compared with the diagonal elements, and by suppressing other axis interference in this way it is possible to improve robustness and reproducibility of measurement results.

Next, measurement in a case where resistance devices are formed not only on the obverse side of the semiconductor substrate 2, as described above, but also on its reverse side will be described, using the example of a six-axis force sensor made for trials.

Figure 14:
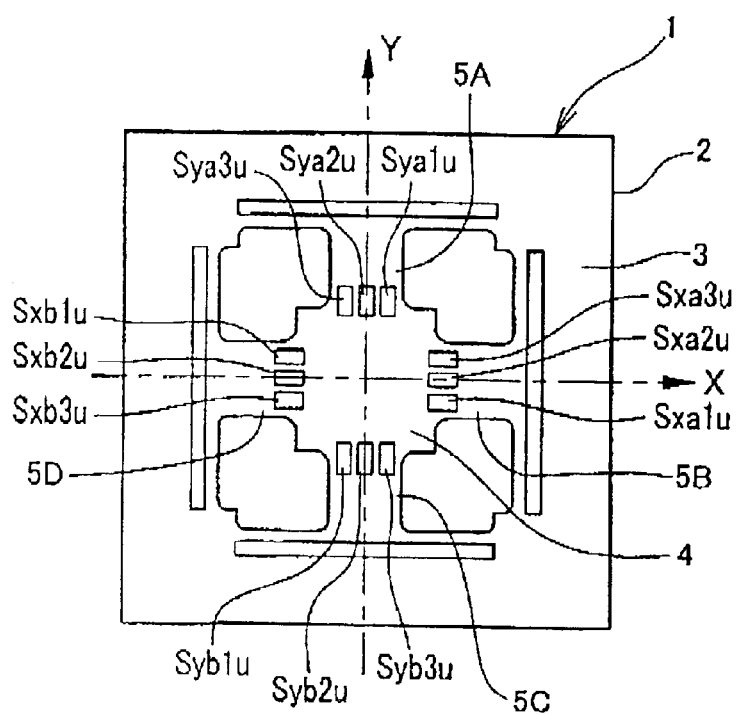
FIG. 14 is a rear side view showing positions of strain resistance devices formed on the rear side of a semiconductor substrate constituting the six-axis force sensor of the first preferred embodiment.

FIG. 14 shows the positions of resistance devices fabricated on the reverse side of a semiconductor substrate 2 forming a six-axis force sensor. This FIG. 14 is a view of the underside of the semiconductor substrate 2 as seen through its upper side (the side already discussed with reference to FIG. 5), and for example a resistance device Sya1u is formed at the back side of the resistance device Sya1 and a resistance device Syb1u is formed at the back side of the resistance device Syb1. These resistance devices on the reverse side are manufactured by the same method as the resistance devices on the front side already discussed. That is, after the resistance devices on the front side are fabricated, the front side is protected by being covered with some suitable material, and semiconductor devices are formed on the rear side by similar processes as those carried out on the front side, after which the protective material is removed from the front side.

The characteristics of a six-axis force sensor 1 made using twelve resistance devices on the front side and four resistance devices on the rear side will now be discussed.

In the same way as that described above with reference to FIG. 13, the diagonal elements 210 of the table shown in FIG. 15 are obtained on the basis of the following formulas (8)–(13). The formulas (8)–(13) are also written in the area 110 of FIG. 15. In the making of the table of FIG. 15, all of the resistance devices on the front side and a resistance device Sya2u on the connecting part 5A, a resistance device Sxa2u on the connecting part 5S, a resistance device Syb2u on the connecting part 5C and a resistance device Sxb2u on the connecting part 5D on the rear side were used. Although twelve resistance devices are shown in FIG. 14, in the making of the table shown in FIG. 15, a six-axis force sensor 1 construction having on its rear side only the resistance devices Sya2u, Sxa2u, Syb2u and Sxb2u, disposed in the positions shown in FIG. 14, was assumed.

$$Sig1=((R'Sxb2+R'Sxb2u)-(R'Sxa2+R'Sxa2u))/4 \tag{8}$$

$$Sig2=((R'Syb2+R'Syb2u)-(R'Sya2-R'Sya2y))/4 \tag{9}$$

$$Sig3=((R'Sxa2-R'Sxa2u)+(R'Sya2-R'Sya2u)+(R'Sxb2-R'Sxb2u)+(R'Syb2-R'Syb2u))/8 \tag{10}$$

$$Sig4=((R'Sya2-R'Sya2u)-(R'Syb2-R'Syb2u))/4 \tag{11}$$

$$Sig5=((R'Sxb2-R'Sxb2u)-(R'Sxa2-R'Sxa2u))/4 \tag{12}$$

$$Sig6=((R'Sxa3-R'Sxa1)+(R'Sya3-R'Sya1)+(R'Sxb3-R'Sxb1)+(R'Syb3-R'Syb1))/8 \tag{13}$$

In obtaining the computed resistance change proportions Sig1–Sig6 of the respective force and moment components, as in the formulas (1)–(6), in the formulas (8)–(13) also, combining of resistance devices such that other axis interference does not occur is carried out.

Whereas with resistance devices provided only on the front side of the six-axis force sensor 1 it was not possible to make all of the non-diagonal elements "0", as shown in the table of FIG. 13, by also using resistance devices disposed on the rear side of the substrate, it becomes possible to group the resistance devices in the formulas (8)–(13) so that all of the non-diagonal elements become "0", as shown in the table of FIG. 15.

For example, when a force Fx is applied to the action part 4, in formula (8), which is for obtaining the computed resistance change proportion Sig1, a computed resistance change proportion as pertaining to one resistance device is obtained by combinations of the resistance devices Sxb2 and Sxa2 and the resistance devices Sxb2u and Sxa2u, which face each other on the front and rear sides of the six-axis force sensor 1. When the force Fx acts on the action part 4, a tensile force, albeit small, acts on each of the resistance devices Sxb2 and Sxb2u, and a compressive force, albeit small, acts on the resistance devices Sxa2, Sxa2u.

For example, when a moment My is applied to the action part 4, in the case where there are resistance devices on the front side of the substrate only, a number, albeit a very small value, appears as other axis interference in the computed resistance change proportion Sig1 for detecting a force Fx as shown in FIG. 13. However, it resistance devices are provided on the rear side of the substrate and suitable resistance devices among these are selected and used in formula (8) based on the resistance change proportion of the resistance element to compute the computed resistance change proportion Sig1, when a moment My is applied the resistance change proportions R'Sxb2 and R'Sxb2u cancel each other out and the resistance change proportions R'Sxa2 and R'Sxa2u cancel each other out. Consequently, the value of the computed resistance change proportion Sig1 constituting the non-diagonal element with respect to the moment My is "0".

In the same way as the equation (7) was obtained, by finding the inverse matrix of the matrix in the table of FIG. 15, a matrix showing a (computed resistance change proportion—force and moment) relationship can be obtained.

On the basis of this (computed resistance change proportion—force and moment) relationship matrix, it is possible to write the following (computed resistance change proportion–force and moment) relationship equation (14).

$$\begin{pmatrix} +Fx[N] \\ +Fy[N] \\ +Fz[N] \\ +Mx[N \cdot cm] \\ +My[N \cdot cm] \\ +Mz[N \cdot cm] \end{pmatrix} = \begin{pmatrix} 5263.2 & 0 & 0 & 0 & 0 & 0 \\ 0 & 5263.2 & 0 & 0 & 0 & 0 \\ 0 & 0 & 146.8 & 0 & 0 & 0 \\ 0 & 0 & 0 & 23.6 & 0 & 0 \\ 0 & 0 & 0 & 0 & 23.6 & 0 \\ 0 & 0 & 0 & 0 & 0 & 84.2 \end{pmatrix} \times \begin{pmatrix} Sig1 \\ Sig2 \\ Sig3 \\ Sig4 \\ Sig5 \\ Sig6 \end{pmatrix} \quad (14)$$

From the above, in equation (14), by multiplying a column vector of computed resistance change proportions obtained with the above-mentioned formulas (8)–(13) using measured resistance change proportions by the above-mentioned matrix pertaining to the (computed resistance change proportion—force and moment) relationship, it is possible to obtain an applied external force separated into six components of force and moment.

As is clear from the (computed resistance change proportion—force and moment) relationship matrix on the right side of equation (14), the non-diagonal elements are all "0", calculation is easy, other axis interference can be greatly suppressed, robustness and reproducibility of measured values improves, and measurement sensitivity and measurement precision increase.

Compared to the matrix in equation (7), the sizes of the diagonal elements in equation (14) are different. However, this is because these are values obtained by experimental measurement; in a six-axis force sensor according to the invention these values can be suitably adjusted by adjustment of the thickness of the substrate, the width of the bridge parts, and the disposition of the resistances, and the measurement sensitivity can be adjusted as necessary according to the application and also by axis direction.

Next, characteristics of a six-axis force sensor 1 constructed using twelve resistance devices on the front side and twelve resistance devices on the rear side will be discussed. By the same method as that explained in connection with the table shown in FIG. 13, diagonal elements 220 of the table shown in FIG. 16 are obtained on the basis of the following formulas (15)–(20). These formulas are also shown in area 120 of FIG. 16. In the making of the table shown in FIG. 16, all of the resistance devices on the front side of the six-axis force sensor and all of the resistance devices on the rear side shown in FIG. 14, namely the resistance devices Sya1u–Sya3u on the conecting part 5A, the resistance devices Sxa1u–Sxa3u on the connecting part 5B, the resistance devices Syb1u–Syb3u on the connecting part 5C and the resistance devices Sxb1u–Sxb3u on the connecting part 5D, are used.

$$Sig1=((R'Sya1-R'Sya3)+(R'Syb3-R'Syb1)+(R'Sya1u-R'Sya3u)+(R'Syb3u-R'Syb1u))/8 \quad (15)$$

$$Sig2=((R'Sxa3-R'Sxa1)+(R'Sxb1-R'Sxb3)+(R'Sxa3u-R'Sxa1u)+(R'Sxb1u-R'Sxb3u))/8 \quad (16)$$

$$Sig3=((R'Sxa2-R'Sxa2u)+(R'Sya2-R'Sya2u)+(R'Sxb2-R'Sxb2u)+(R'Syb2-R'Syb2u))/8 \quad (17)$$

$$Sig4=((R'Sya2-R'Sya2u)-(R'Syb2-R'Syb2u))/4 \quad (18)$$

$$Sig5=((R'Sxb2-R'Sxb2u)-(R'Sxa2-R'Sxa2u))/4 \quad (19)$$

$$Sig6 = ((R'Sxa3 - R'Sxa1) + (R'Sya3 - R'Sya1) +$$

$$(R'Sxb3 - R'Sxb1) + (R'Syb3 - R'Syb1) +$$

-continued $$(R'Sxa3u - R'Sxa1u) + (R'Sya3u - R'Sya1u) +$$

$$(R'Sxb3u - R'Sxb1u) + (R'Syb3u - R'Syb1u))/16$$

Here, in obtaining the computed resistance change proportions Sig1–Sig6 of the respective force and moment components, as with the formulas (1)–(6) and the formulas (8)–(13), in the above formulas (15)–(20), resistance devices are used in such combinations that other axis interference does not occur.

Whereas when resistance devices were only provided on the front side of the six-axis force sensor 1 it was not possible to bring all of the non-diagonal elements to "0", as shown in the table of FIG. 13, here, as shown in FIG. 16, as in the case of FIG. 15, it is possible to combine the resistance devices in the formulas (15)–(20) so that all of the non-diagonal elements become "0". Also, because the values corresponding to the resistance devices Sya1 and Sya2 among the diagonal elements 220 can be made larger than in the table of FIG. 15, the sensitivity with which the forces Fx and Fy are detected can be increased.

For example, when a force Fx is applied to the action part 4, in the formula (15) for obtaining Sig1, a computed resistance change proportion as pertaining to one resistance device is obtained by using combinations of the resistance devices Sya1, Sya3, Syb1 and Syb3 and the resistance devices Sya1u, Sya3u, Syb1u and Syb3u, which face each other on the front and rear sides of the substrate. When a force Fx is applied to the action part 4, a tensile force acts on each of the resistance devices Sya1, Syb3, Sya1u and Syb3u and a compressive force acts on each of the resistance devices Sya3, Syb1, Sya3u and Syb1u. At this time, because as shown in formulas (8) and (9) the resistance devices where the force Fx is absorbed by an elastic part are not used, the applied external force can be separated into force and moment components without the measurement sensitivity falling, and the precision and sensitivity with which the applied external force is measured can be increased. In the same way as equation (7) was obtained, a (computed resistance change proportion–force and moment) relationship matrix is obtained by finding the inverse matrix of the matrix in the table of FIG. 16. On the basis of this (computed resistance change proportion—force and moment) relationship matrix the following equation (21), which is a (computed resistance change proportion—force and moment) relationship equation, is written.

$$\begin{pmatrix} +Fx[N] \\ +Fy[N] \\ +Fz[N] \\ +Mx[N\cdot cm] \\ +My[N\cdot cm] \\ +Mz[N\cdot cm] \end{pmatrix} = \begin{pmatrix} 232.0 & 0 & 0 & 0 & 0 & 0 \\ 0 & 232.0 & 0 & 0 & 0 & 0 \\ 0 & 0 & 146.8 & 0 & 0 & 0 \\ 0 & 0 & 0 & 23.6 & 0 & 0 \\ 0 & 0 & 0 & 0 & 23.6 & 0 \\ 0 & 0 & 0 & 0 & 0 & 84.2 \end{pmatrix} \times \begin{pmatrix} Sig1 \\ Sig2 \\ Sig3 \\ Sig4 \\ Sig5 \\ Sig6 \end{pmatrix} \quad (21)$$

From the above, in equation (21), by multiplying a column vector of computed resistance change proportions measured by experiment by the (computed resistance change proportion—force and moment) relationship matrix, it is possible to obtain an applied external force separated into six components of force and moment.

As is clear from the (computed resistance change proportion—force and moment) relationship matrix on the right side of equation (21), the non-diagonal elements are all "0" and other axis interference is greatly suppressed; consequently, robustness and reproducibility of measured values improve, and because also the values of the diagonal elements are more similar to each other than those in equation (14), measurement sensitivity and measurement precision are further increased.

Also, in a six-axis force sensor according to this preferred embodiment, these figures can be freely adjusted by adjustment of the thickness of the substrate, the width of the bridge part and the disposition of the resistance devices, and the measurement sensitivity can be adjusted as necessary according to the application and also by axis direction.

The parameters and shape of the six-axis force sensor and the dimensions of its constituent parts are to be optimized as necessary according to the application in which the sensor is to be used, and the various figures given above are no more than one example. Although a specific preferred embodiment of the invention has been described above in some detail with reference to drawings, the specific construction of a sensor according to the invention is not limited to this preferred embodiment, and various design changes can be made within the scope of the invention.

In the foregoing first preferred embodiment the dispositions of the semiconductor resistances only constitute one example, and similar effects can be obtained by any disposition of resistance devices with which it is possible to prevent other axis interference by obtaining combinations of resistance devices such that non-diagonal elements in a matrix showing a computed resistance change proportion–force and moment relationship cancel each other out and to obtain formulas for computing computed resistance change proportions corresponding to forces and moments like the formulas (1)–(6), (8)–(13) and (15)–(20).

In this first preferred embodiment, a structure wherein the n-type semiconductor substrate 2 of the six-axis force sensor 1 is of crystal direction (100)-plane and the electrical current axes of semiconductor resistance devices consisting of p-type active layers S are disposed in the <011> or <0-11> direction was described. However, alternatively a semiconductor substrate 2 of crystal direction (110)-plane can be used and the electrical current axes of the semiconductor resistance devices consisting of p-type active layers S are disposed in the <1-10> or <00-1> direction. Or a semiconductor substrate 2 of crystal direction (110)-plane can be used and the electrical current axes of the semiconductor resistance devices consisting of p-type active layers S are disposed in the <1-1-1> or <-11-2> direction.

By means of these combinations of crystal direction and current axes it is possible to obtain larger resistance changes with respect to the same strains, and it is possible to improve the precision with which the force and moment components of an applied external force can be measured.

Figure 17:
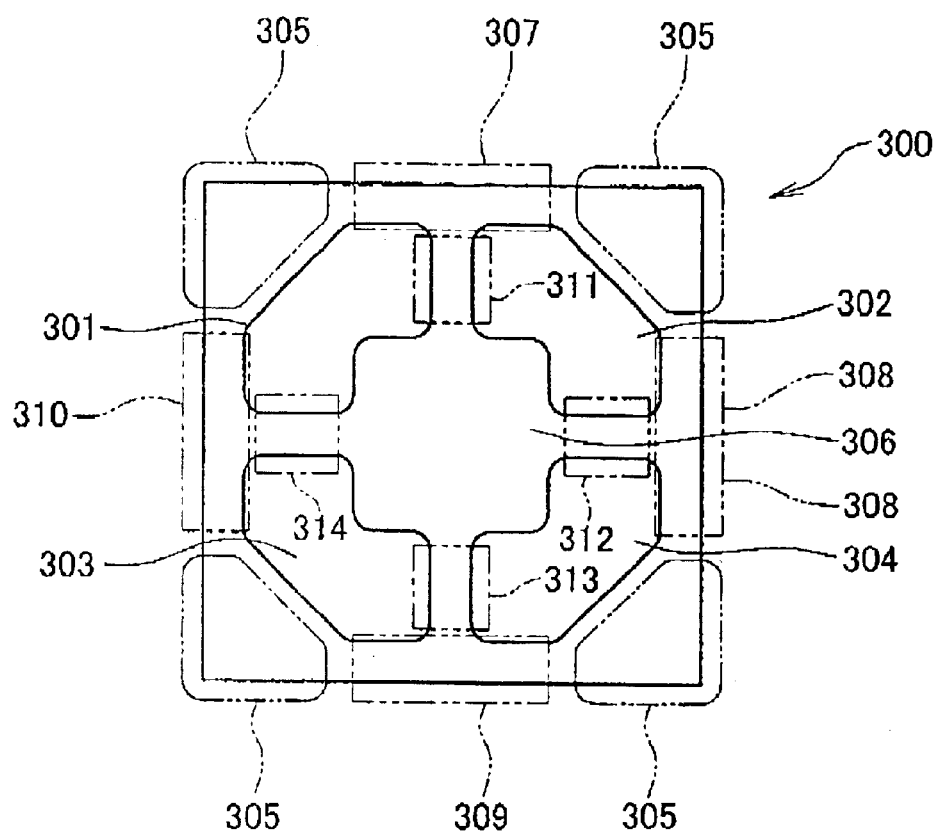
FIG. 17 is a plan view showing a second preferred embodiment of a six-axis force sensor according to the invention.

As a second preferred embodiment of the invention, it is possible to obtain the same results as those of the preferred embodiment described above in a six-axis force sensor having the structure shown in FIG. 17. FIG. 17 is a plan view showing the construction of a six-axis force sensor 300 constituting a second preferred embodiment. This six-axis force sensor 300 is made up of hole regions 301–304, support parts 305, an action part 306, elastic parts 307, 308, 309, 310 and bridge parts 311, 312, 313 and 314.

The layout and number of resistance devices is the same as in the first preferred embodiment described above, and the method by which the computed resistance change proportions and force and moment components are obtained is also the same as in the first preferred embodiment.

The point in which this second preferred embodiment differs from the first preferred embodiment is that there is no equivalent of the hole regions A, B, C and D, and the elastic parts 307, 308, 309 and 310 are given their low rigidity by being made thin. When the supporting parts 305 are fixed to a mount, the elastic parts 307, 308, 309 and 310 operate as elastic bodies in the same way as the elastic parts 5Ab, 5Bb, 5Cb and 5Db of the preferred embodiment described above.

A third preferred embodiment of a six-axis force sensor according to the invention will now be described, with reference to FIG. 18 through FIG. 26.

Figure 18:
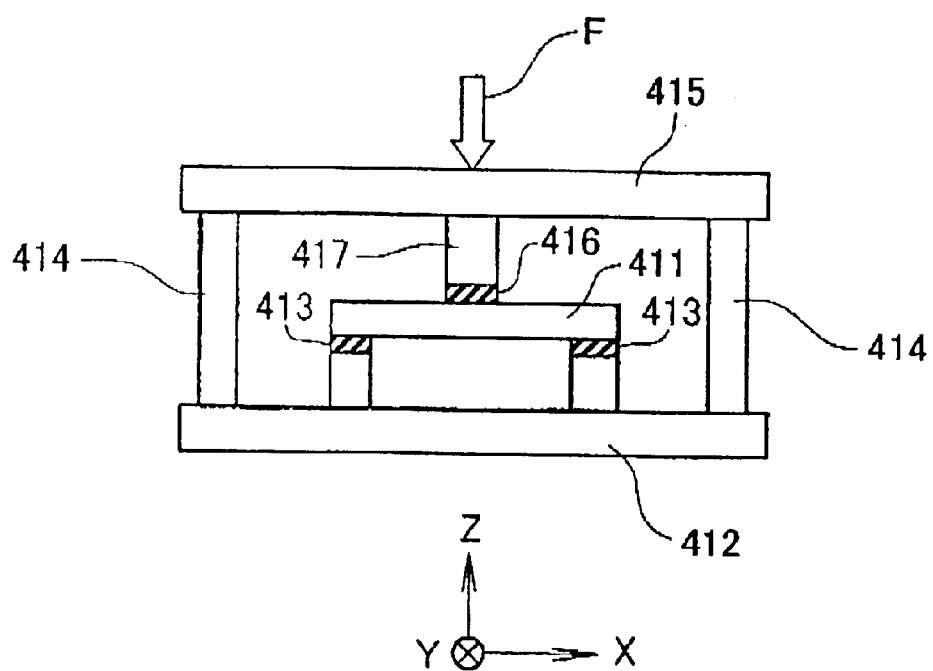
FIG. 18 is a side view showing schematically a third preferred embodiment of a six-axis force sensor according to the invention.

FIG. 18 is a side view showing schematically a six-axis force sensor according to a third preferred embodiment. A sensor chip 411 has the same structure and function as the six-axis force sensor or sensor chip 1 of the first preferred embodiment having twelve resistance devices on its front side. Like the sensor chip 1, the sensor chip 411 has a central action part for receiving an external force, a support part supporting this action part, and connecting parts connecting the action part and the support part together. The sensor chip 411 is mounted on a plinth part 412 by way of insulating members 413. The support part of the sensor chip 411 is fixed to the plinth part 412. An external force application part 415 is mounted on the plinth part 412 by way of a number of buffering pillars 414. The external force application part 415 is a plate-shaped member and is disposed above the sensor chip 411. The buttering pillars 414 have the function of a shock-absorbing structure. The external force application part 415 is connected to the action part of the sensor chip 411 by the connecting rod 417 through an insulating member 416.

Because the front side of the sensor chip 411, on which the devices are formed, is covered with an insulating protective film, the insulating member 416 can alternatively be dispensed with.

With respect to the sensor chip 411, which has the six-axis force sensor function, the structure made up of the plinth part 412 and the buffering pillars 414 and the external force application part 415 forms a box frame. This box frame, on the basis of its buffering mechanism, has the function of attenuating the external force before applying it to the action part of the sensor chip 411.

In the construction described above, the plinth part 412 and the external force application part 415 are made of members having high strength. The unknown external force (load) F is applied to the external force application part 415. The position and attitude of the external force application part 415 subject to the external force F change. As they occur, these changes in the position and attitude of the external force application part 415 are subject to limitation by the buffering action of the buffering pillars 414 arranged between the plinth part 412 and the external force applicant part 415. Changes in position and attitude arising in the external force application part 415 are transmitted to the action part of the sensor chip 411 via the connecting rod 417. A force (or moment) limited by the buffering pillars 414 acts on the action part of the sensor chip 411. When an external force is inputted to the external force application part 415, a force attenuated by the buffering mechanism based on the buttering pillars 414 is applied to the action part of the sensor chip 411. Consequently, even in the case of an external force which would break the sensor chip 411, which was fabricated as a semiconductor sensor device, if inputted directly to the sensor chip 411, breaking of the sensor chip 411 can be prevented by means of the buffering mechanism based on the above-mentioned box frame. On the other hand, whereas with a sensor chip on its own the level of force which can be detected is limited to a small range from a materials point of view, by providing this box frame having a buffering mechanism it is possible to make the detectable range of force large.

The strain attenuating rate of the distorting body part in the sensor chip 411 having the six-axis force sensor function is different for each of the six axis components, and also depends on the structure of the buffering mechanism of the box frame. Therefore, for example when wanting to adjust the sensitivity of the sensor chip 411, which is the six-axis force sensor, axis by axis, by optimizing the structure of the box frame to match the adjustment objectives it is possible to adjust the six-axis force sensor made up of the sensor chip 411 and the box frame having the buffering mechanism to required characteristics.

The above-mentioned insulating members 413, 416 are provided to prevent noise affecting the signals outputted from the sensor chip 411.

For the sensor chip 411, the signals Sig1–Sig6 determined using the above-mentioned formulas (1)–(6) on the basis of resistance change proportions of the twelve resistance devices formed on the front side of the chip and the six axis forces Fx, Fy, Fz, Mx, My, Mz applied to the sensor chip 411, when the relationships between the two are obtained experimentally by finding the output signals of the six-axis force sensor corresponding to specific axis force components, can be related by the matrix table shown in FIG. 19.

When inverse matrix calculation is carried out on the basis of the matrix shown in FIG. 19 and six axis components are computed, the following equation (22) is obtained.

diagonal elements are dominant and therefore the possibility of problems of other axis interference arising has been suppressed.

The sensor chip 411 according to the invention described in the first preferred embodiment has reduced other axis interference, is resistant to noise, and has excellent reproducibility in its detection characteristics. On the other hand, when the strains produced by the external force applied to the action part become large, the six signals Sig1–Sig6 also become large in proportion with these strains, and if this reaches a certain limit value imposed by the nature of the sensor chip as a semiconductor device, the device will break. Therefore, when the external force is applied directly to the action part of the sensor chip 411, the sensor chip 411 will break under a relatively small external force. It is to avoid this that in this third preferred embodiment a sensor chip 411 having the detection characteristics described above is provided with a box frame having a buffering structure of the kind described above and shown in FIG. 18. A six-axis force sensor made up of a sensor chip 411 and a box frame like this has increased strength and an enlarged detectable range of external forces.

Figure 20:
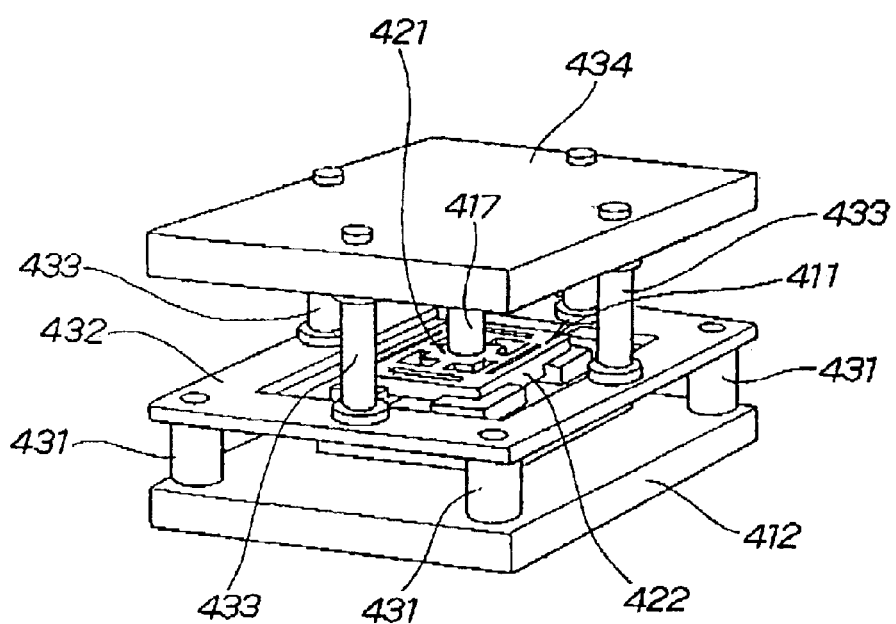
FIG. 20 is a perspective view showing a first specific structure of a six-axis force sensor according to the third preferred embodiment.
Figure 21:
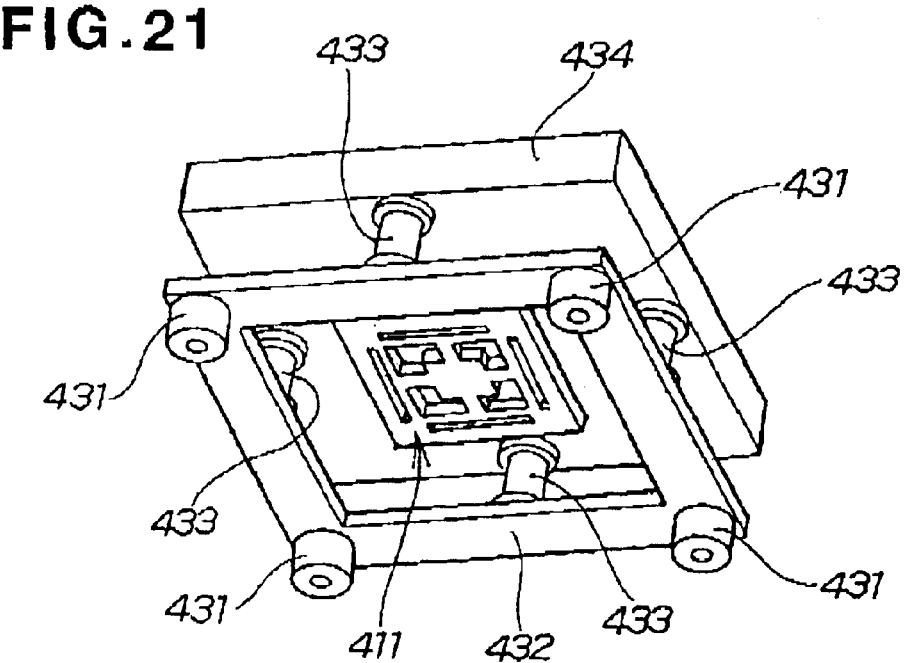
FIG. 21 is a perspective view from below showing the positions of a plate-like frame member, a sensor chip and an external force application part of the six-axis force sensor of the first specific example.
Figure 22:
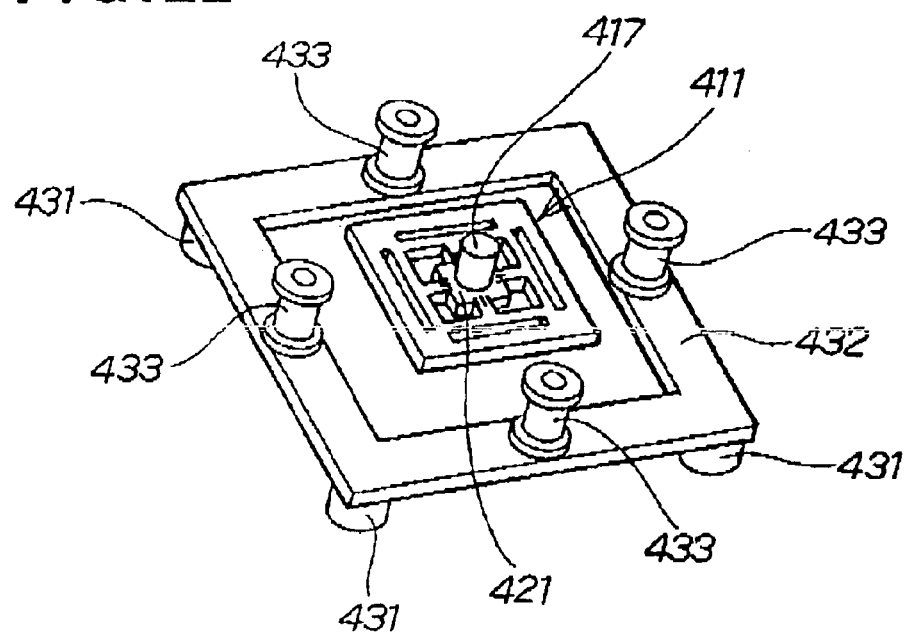
FIG. 22 is a perspective view from above showing the positions of the plate-like frame member and the sensor chip in the six-axis force sensor of the first specific example.
Figure 23:
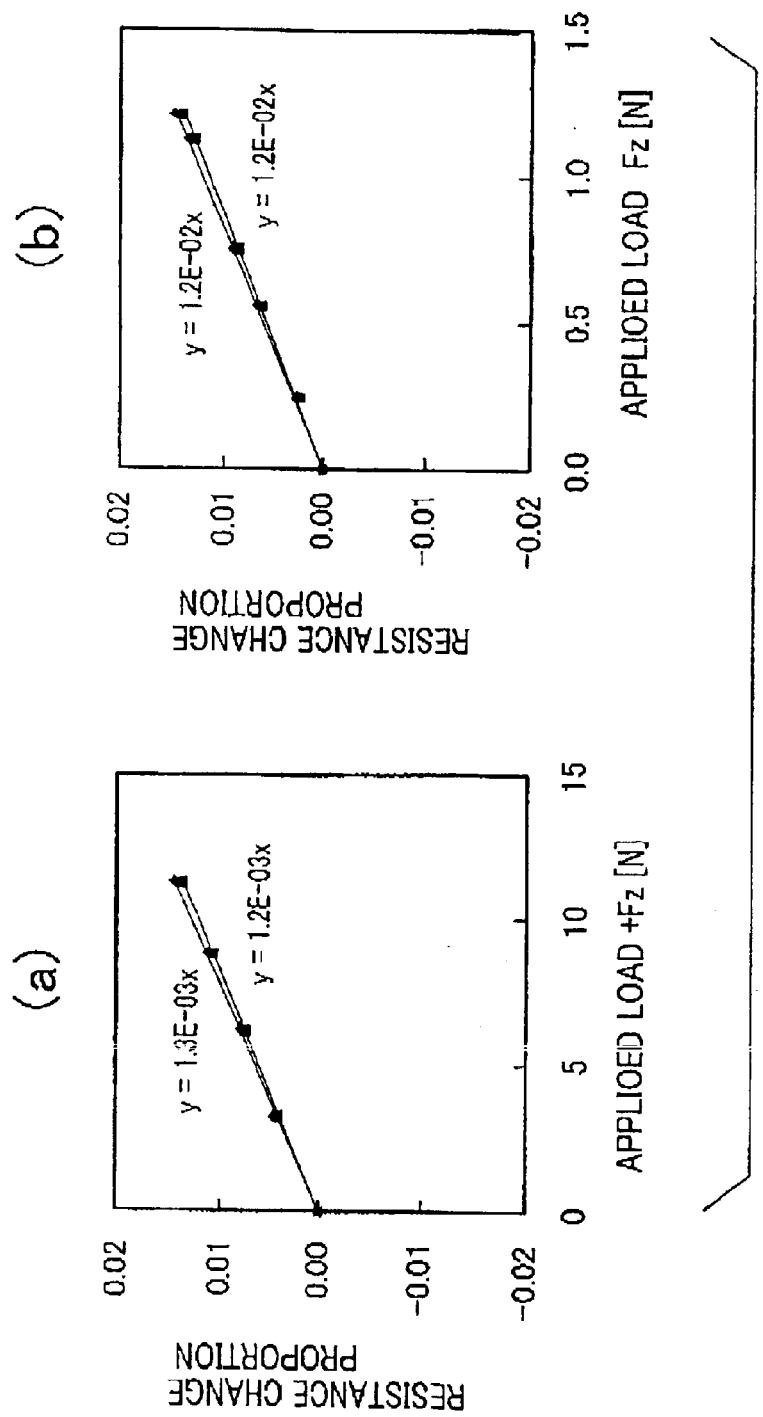
FIGS. 23(a) and (b) are graphs showing for comparison a measurement characteristic example (a) pertaining to the six-axis force sensor of the first specific example and a measurement characteristic example (b) pertaining to the sensor chip on its own.

Next, a first specific example of a six-axis force sensor according to this third preferred embodiment will be described, with reference to FIG. 20 through FIG. 22. This first specific example will make clear the actual construction of a sensor according to this third preferred embodiment. In FIG. 20 through FIG. 22, elements essentially the same as elements described above with reference to FIG. 18 have been given the same reference numbers.

A sensor chip 411 is fixed to a plinth part 412 by its support part 422. The sensor chip 411 is disposed at a required height in a central position on the plinth part 412. The plinth part 412 has four support rods 431 erected at its corners, and a square frame plate member 432 is mounted on the four support rods 431. The support rods 431 are fixed to the four corners of the square frame plate member 432. The frame plate member 432 is made of for example aluminum plate. Middle support rods 433 are erected at middle positions on the four sides of the square frame plate member 432. The four middle support rods 433 support an external force application plate 434. The external force application plate 434 is for example an aluminum plate. The center of the external force application plate 434 is connected to an action part 421 of the sensor chip 411 by a connecting rod 417. An external force acting on the external force application plate 434 is indirectly transmitted to the action part 421 of the sensor chip 411 by the connecting rod 417. The external force application plate 434 is supported by a buffering mechanism made up of the four support rods 431, the frame plate member 432 and the four middle support rods 433. This buffering mechanism attenuates the external force transmitted to the sensor chip 411 by the connecting rod 417.

$$\begin{pmatrix} Fx[N] \\ Fy[N] \\ Fz[N] \\ Mx[N \cdot cm] \\ My[N \cdot cm] \\ Mz[N \cdot cm] \end{pmatrix} = \begin{pmatrix} 1462 & 0 & .0 & 0 & -470 & 0 \\ 0 & 1462 & 0 & 470 & 0 & 0 \\ -3 & -2 & 833 & 2 & 4 & 115 \\ 0 & 173 & 0 & 1515 & 0 & 0 \\ -173 & 0 & 0 & 0 & 1515 & 0 \\ 0 & 0 & 0 & 0 & 0 & 7692 \end{pmatrix} \times \begin{pmatrix} Sig1 \\ Sig2 \\ Sig3 \\ Sig4 \\ Sig5 \\ Sig6 \end{pmatrix} \quad (22)$$

As shown by this equation, when the relationship between the six signals from the sensor chip 411 and the detected six axis components is viewed as the elements of a matrix, the FIG. 21 is a view of the relationship between the sensor chip 411 and the external force application plate 434 and the buffering mechanism as seen from below. In FIG. 21, to make the figure clearer, the plinth part 412 is not shown. FIG. 22 is a view of the relationship between the sensor chip 411 and the buffering mechanism as seen from above. In FIG. 22 the external force application plate 434 is not shown. The support rods 431 and the middle support rods 433 of the buffering mechanism are cylindrical pillarlike members. The connecting rod 417 is also a cylindrical pillarlike member, and is connected to the action part 421 of the sensor chip 411 by an adhesive. To effect electrical separation from the sensor chip 411, an insulating member is interposed between the sensor chip 411 and the plinth part 412.

With a six-axis force sensor having this construction, because the buffering mechanism is made with a beam structure, the detection sensitivities of Fz, Mx and My can be increased.

For a six-axis force sensor having the buffering mechanism shown in FIG. 20, when the relationship between the six axis components and the output signals Sig1–Sig6 was obtained by the same method as in the case of the sensor chip 411 described above, it was as follows.

$$\begin{pmatrix} Fx\,[N] \\ Fy\,[N] \\ Fz\,[N] \\ Mx\,[N\cdot cm] \\ My\,[N\cdot cm] \\ Mz\,[N\cdot cm] \end{pmatrix} = \begin{pmatrix} 128.9 & 0 & .0 & 0 & 3.1 & 0 \\ 0 & 128.9 & 0 & -3.1 & 0 & 0 \\ 0.3 & 0.2 & 83.3 & -0.6 & -0.6 & 24 \\ 0 & 0.6 & 0 & 13.9 & 0 & 0 \\ -0.6 & 0 & 0 & 0 & 13.9 & 0 \\ 0 & 0 & 0 & 0 & 0 & 60.6 \end{pmatrix} \times \begin{pmatrix} Sig1 \\ Sig2 \\ Sig3 \\ Sig4 \\ Sig5 \\ Sig6 \end{pmatrix} \quad (23)$$

By providing the sensor chip 411 with the box frame (buffering mechanism) shown in FIG. 20, it is possible to attenuate the external force and reduce the strain arising in the sensor chip 411. Accordingly, the coefficients are larger than in the case of the sensor chip on its own. When these coefficients are taken as the matrix elements of the above equation, as in the matrix for the sensor chip on its own, the values of the diagonal elements are large and the non-diagonal elements are either much smaller than the diagonal elements or are zero ("0"), and therefore the effect of suppressing other axis interference has been maintained. Looking at the diagonal elements, for Fx and Fy the coefficients have increased by a factor of ten, and the detectable external force has increased by approximately ten times. Also for the moments Mx and My, the coefficients have increased by a factor of one hundred, and the range of detectable external force has also increased by approximately one hundred times. Because it is possible to control the sizes of the coefficients by optimizing the structure of the buffering mechanism, it is possible to realize desired characteristics of the six-axis force sensor (for example, increase the withstandable force Fz load).

FIGS. 23(a) and (b) show a comparison of an example measuring characteristic (a) of the six-axis force sensor pertaining to the first specific example shown in FIG. 20 and an example measuring characteristic (b) of a sensor chip on its own. In these figures, the horizontal axis of each graph shows applied load Fz[N] and the vertical axis shows resistance change proportion. As is clear from FIGS. 23(a) and (b), compared to the case of a sensor chip on its own, the rated load of a six-axis force sensor according to this preferred embodiment is ten times larger. Thus the measurement range of the six-axis force sensor has been raised by about ten times, and the load-withstanding performance has increased.

Figure 24:
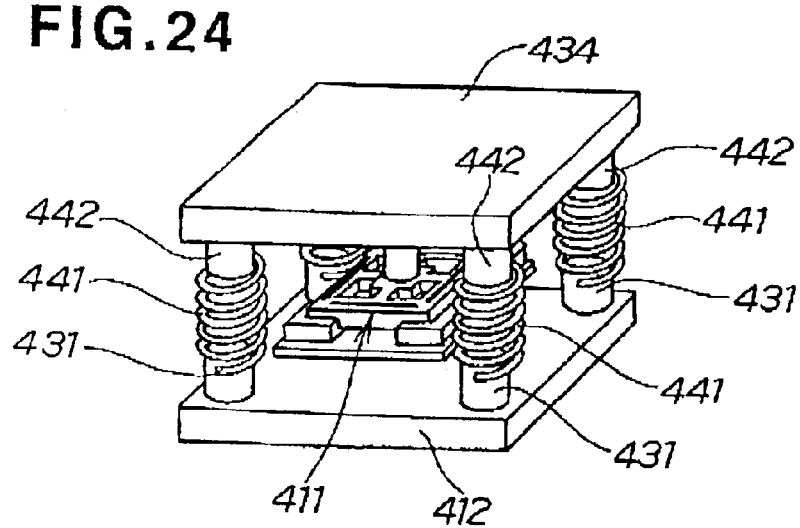
FIG. 24 is a perspective view showing a second specific structure of the six-axis force sensor of the third preferred embodiment.

A second specific example of a six-axis force sensor according to the third preferred embodiment will now be described, with reference to FIG. 24. In FIG. 24, elements essentially the same as elements described above with reference to the first specific example have been assigned the same reference numbers. In the six-axis force sensor of this specific example, four coil springs 441 are used as the buffering mechanism. Rods 442 are attached to the four corners of the underside of a square external force application plate 434, and the coil springs 441 are fixed between these rods 442 and rods 431 fixed to the four corners of the plinth part 412. The rods 431, 442 and the coil springs 441 form pillars having the function of buffering mechanism parts. The rest of the construction is the same as the first specific example. The six-axis force sensor of this second specific example has the same actions and effects as the first specific example.

Figure 25:
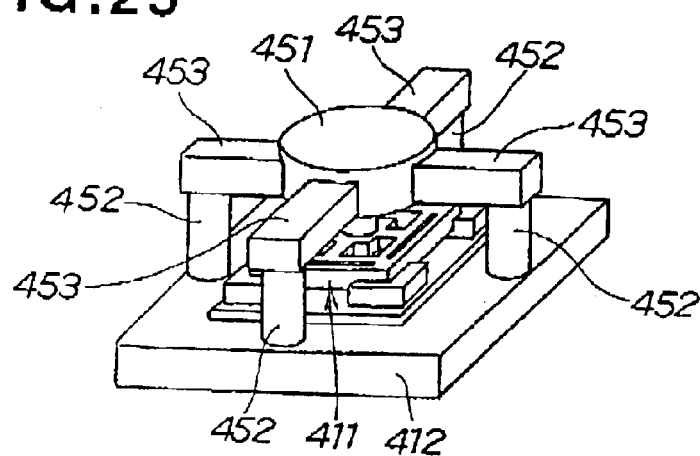
FIG. 25 is a perspective view showing a third specific structure of the six-axis force sensor of the third preferred embodiment.

A third specific example of a six-axis force sensor according to the third preferred embodiment will now be described, with reference to FIG. 25. In FIG. 25, elements essentially the same as elements described above with reference to the first specific example have been assigned the same reference numbers. In the six-axis force sensor of this third specific example, a disc-shaped external force application part 451 is disposed above the sensor chip 411, and this external force application part 451 is supported in each of four places by two connected bar-like members 452, 453 which are respectively vertical and horizontal. The four bar-like member units form a buffering mechanism part. This construction has the characteristic that the horizontal bar-like members 453 constitute beams in the same plane as that in which the external force application part 451 is disposed. The rest of the construction is the same as that of the first specific example. The six-axis force sensor of this third specific example has the same actions and effects as the first specific example.

Figure 26:
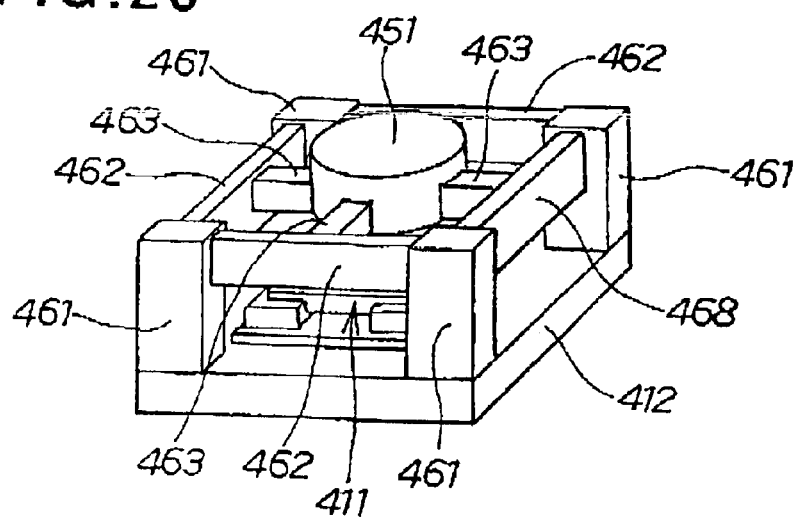
FIG. 26 is a perspective view showing a fourth specific structure of the six-axis force sensor of the third preferred embodiment.

A fourth specific example of a six-axis force sensor according to the third preferred embodiment will now be described, with reference to FIG. 26. In FIG. 26, elements essentially the same as elements described above with reference to the first specific example have been assigned the same reference numbers. In the six-axis force sensor of this fourth specific example, a disc-shaped external force application part 451 is disposed above the sensor chip 411, pillars 461 are provided at the four corners of a square plinth part 412, supporting frame pieces 462 extend between the four pillars 461, and four supporting frame pieces 463 are provided between the four supporting frame pieces 462 and the external force application part 451 to support the external force application part 451. The supporting frame pieces 462 and 463 constitute beams which form a buffering mechanism part. The rest of the construction is the same as that of the first specific example. This construction has the characteristic D that beams are formed by the horizontal supporting frames 462, 463 in the same plane as that in which the external force application part 451 is disposed. While six-axis force sensor of this fourth specific example has the same actions and effects as the first specific example.

The present disclosure relates to the subject matters of Japanese Patent Application No. 2002-005334, filed Jan. 11, 2002, and Japanese Patent Application No. 2002-059447, filed Mar. 5, 2002, the disclosures of which are expressly incorporated herein by reference in their entireties.

What is claimed is:

1. A six-axis force sensor comprising a thin plate-shaped sensor chip formed using a semiconductor substrate by semiconductor film-forming processes and having a six-axis force sensor function, the sensor chip comprising an action part to which an external force is applied, a support part to be fixed to an external structure, and a plurality of connecting parts each connecting together the action part and the support part and having a bridge part joined to the action part and an elastic part joined to the support part, wherein each of the connecting parts has a plurality of strain resistance devices each comprising an active layer formed on at least one of front and rear faces thereof in an area thereof where deformation strain effectively arises and each electrically connected to corresponding electrodes disposed in the support part, and wherein the connecting parts each have a generally T-shaped configuration formed by the elastic part and the bridge part of each connecting part, the elastic part having opposite ends jointed with the support part, the bridge parts of the respective connecting parts have a width smaller than a width of the action part and are each reduced in width to form a narrowed part located adjacent to a joining portion between each bridge part and the action part, and the strain resistance devices are arranged in sets of plural strain resistance devices, each set being disposed only on that portion of the bridge part of one connecting part including the narrowed part, the sets of strain resistance devices being arranged symmetrically with each other about a center of the action part and spaced at substantially equal distances from the center of the action part.

2. A six-axis force sensor according to claim 1, wherein the connecting parts are disposed around the action part with uniform spacing and so that adjacent connecting parts are mutually perpendicular.

3. A six-axis force sensor according to claim 1, wherein the action part is square and each of the connecting parts of generally T-shaped configuration is disposed at a respective one of the four sides of the action.

4. A six-axis force sensor according to claim 1, wherein the strain resistance devices in each set are disposed on the bridge part of the respective connecting part in parallel with the length direction of the bridge part and arranged side by side in a line in a direction perpendicular to the length direction of the bridge part.

5. A six-axis force sensor according to claim 1, wherein a resistance device for temperature compensation is provided on the support part.

6. A six-axis force sensor according to claim 1, wherein a guard interconnection at a ground potential is provided so as to surround a non-ground interconnection of a strain resistance device.

7. A six-axis force sensor according to claim 1, wherein a bias electrode for applying a bias potential is formed on the substrate.

8. A six-axis force sensor according to claim 1, wherein at least one of the strain resistance devices is disposed on the rear side of the substrate in an area corresponding to an area on the front side of the substrate where strain resistance devices are disposed on one of the bridge parts.

9. A six-axis force sensor according to claim 1, wherein the sensor chip has a plurality of elongated hole extending along and defined partly by the elastic parts of the respective connecting parts.

10. A six-axis force sensor according to claim 1, wherein the strain resistance device comprise twelve strain resistance devices disposed in sets of three, each set being disposed on one of the connecting parts of generally T-shaped configuration.

11. A six-axis force sensor comprising:

a thin plate-shaped sensor chip formed using a semiconductor substrate by semiconductor film-forming processes and having a six-axis force sensor functions, the sensor chip comprising an action part for receiving an external force, a support part supporting the action part and a plurality of connecting parts each connecting together the action part and the support part and having a bridge part joined to the action part and an elastic part joined to the support part, each of the connecting parts having a plurality of strain resistance devices each comprising an active layer formed on at least one of front and rear faces thereof in an area where deformation strain effectively arises and each electrically connected to corresponding electrodes disposed in the support part, the connecting parts each have a generally T-shaped configuration formed by the elastic part and the bridge part of each connecting part, the elastic part having opposite ends jointed with the support part, the bridge parts of the respective connecting parts have a width smaller than a width of the action part and are each reduced in width to form a narrowed part located adjacent to a joining portion between each bridge part and the action part, and the strain resistance devices are arranged in sets of plural strain resistance devices, each set being disposed only on that portion of the bridge part of one connecting part including the narrowed part, the sets of strain resistance devices being arranged symmetrically with each other about a center of the action part and spaced at substantially equal distances from the center of the action part; and a structural body provided around the sensor chip and comprising an external force application part to which an external force is applied, a plinth part for supporting the sensor chip, an external force buffering mechanism fixing the external force application part to the plinth part, and an external force transmitting part.

12. A six-axis force sensor according to claim 11, wherein an insulating member is provided between the sensor chip and the plinth part.

13. A six-axis force sensor according to claim 12, further comprising an insulating member disposed between the external force transmitting part and the action part of the sensor chip.

14. A six-axis force sensor according to claim 11, further comprising an insulating member disposed between the external force transmitting part and the action part of the sensor chip.

* * * * *